United States Patent [19]

Choi et al.

[11] 4,077,847

[45] Mar. 7, 1978

[54] SOLID WASTE DISPOSAL SYSTEM

[75] Inventors: Charles K. Choi, Claremont; Booker W. Morey, Pasadena; Robert W. Frischmuth, Huntington Beach; Joseph P. Tassoney, Diamond Bar; Richard M. Gundzik, Placentia, all of Calif.

[73] Assignee: Occidental Petroleum Corporation, Los Angeles, Calif.

[21] Appl. No.: 719,261

[22] Filed: Aug. 31, 1976

Related U.S. Application Data

[63] Continuation-in-part of Ser. No. 603,865, Aug. 11, 1975, abandoned.

[51] Int. Cl.² .................... B03B 7/00; B03B 9/00; C10B 49/16; C10B 53/02
[52] U.S. Cl. ............................ 201/21; 48/111; 48/209; 201/2.5; 201/3; 201/8; 201/12; 201/22; 201/25; 201/28; 201/33; 201/42; 202/99; 209/3; 209/10; 209/12
[58] Field of Search ............. 201/2, 5, 3, 4, 7, 8, 201/10, 12, 13, 14, 15, 16, 20, 21, 25, 28, 29, 30, 31, 32, 37, 42, 33, 38, 22; 48/111, 209, 197 A; 209/3, 10, 12, 138, 166, 212; 202/85, 88, 91, 93, 96, 99, 108, 121, 208, 211, 215, 86, 87

[56] References Cited

U.S. PATENT DOCUMENTS

| 565,577 | 8/1896 | Stanley | 209/12 |
|---|---|---|---|
| 2,307,059 | 1/1943 | Moore | 209/98 |
| 2,560,403 | 7/1951 | Arveson | 48/202 |
| 2,608,526 | 8/1952 | Rex | 201/31 X |
| 2,741,549 | 4/1956 | Russell | 48/206 |
| 2,803,346 | 8/1957 | Weston et al. | 209/138 X |
| 3,167,494 | 1/1965 | Crawford | 208/8 |
| 3,251,751 | 5/1966 | Lindahl et al. | 201/12 |
| 3,322,521 | 5/1967 | Cockerham | 48/63 |
| 3,444,048 | 5/1969 | Schmeling et al. | 202/121 |
| 3,567,511 | 3/1971 | Tilby | 209/138 X |
| 3,574,065 | 4/1971 | Eddinger et al. | 201/12 |
| 3,650,396 | 3/1972 | Gillespie | 209/3 |
| 3,655,518 | 4/1972 | Schmalfeld et al. | 202/108 |
| 3,698,882 | 10/1972 | Garrett et al. | 48/210 |
| 3,720,380 | 3/1973 | Marsh | 241/20 |
| 3,725,538 | 4/1973 | Brewer | 201/25 X |
| 3,736,111 | 5/1973 | Gardner et al. | 201/25 X |
| 3,736,233 | 5/1973 | Sass et al. | 201/31 X |
| 3,817,458 | 6/1974 | Gilberto | 241/20 |
| 3,824,516 | 7/1974 | Benowitz | 209/212 X |
| 3,846,096 | 11/1974 | Mallan et al. | 48/209 |
| 3,853,498 | 12/1974 | Bailie | 201/2.5 X |
| 3,945,575 | 3/1976 | Marsh | 241/20 |
| 3,950,661 | 4/1976 | Langmuir | 310/12 |
| 3,957,459 | 5/1976 | Mitchell et al. | 201/31 X |

FOREIGN PATENT DOCUMENTS

| 964,773 | 3/1975 | Canada. |
| 7,229,250 | 3/1973 | France. |
| 4,802,971 | 4/1973 | Japan. |
| 1,353,067 | 6/1971 | United Kingdom. |
| 1,398,858 | 8/1972 | United Kingdom. |

OTHER PUBLICATIONS

Bowicier et al., Chemical Abstracts, vol. 79, p. 200, item 34879q (1973).

Morey et al., Chemical Abstracts, vol. 79, p. 200, item 34880h (1973).

Paper entitled, "Glass Recovery from Municipal Trash by Froth Flotation," by Booker Morey and J.P. Cummings, presented at the Proceedings of the Third Mineral Waste Utilization Symposium, in Chicago, Illinois on Mar. 14–16, 1972.

*Primary Examiner*—Joseph Scovronek
*Attorney, Agent, or Firm*—Christie, Parker & Hale

[57] ABSTRACT

There is provided a system for segregating through comminution and classification solid waste into ferrous metal, inorganic, and organic fractions. The inorganic fraction is further classified into aluminum and glass fractions. The organic fraction is further comminuted, dried and fed to a pyrolysis system where it is converted to gas for use in drying the organic material for feed to the pyrolysis system, pyrolytic oils and char. The principal saleable products recovered are char, pyrolytic oils, glass, aluminum, and ferrous metal.

21 Claims, 14 Drawing Figures

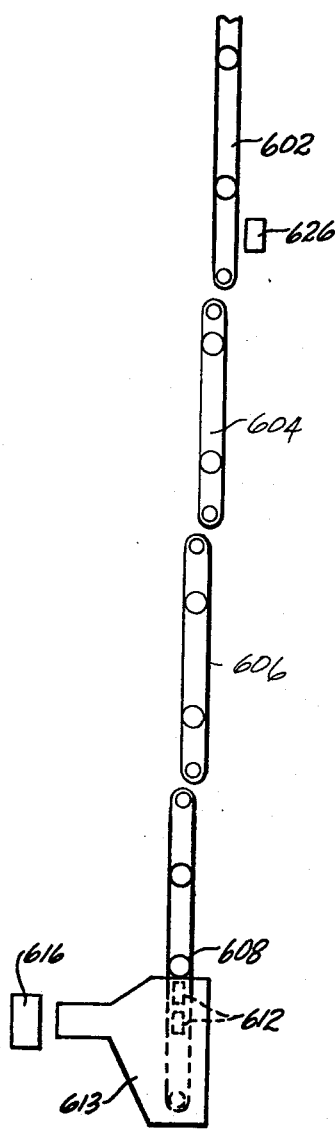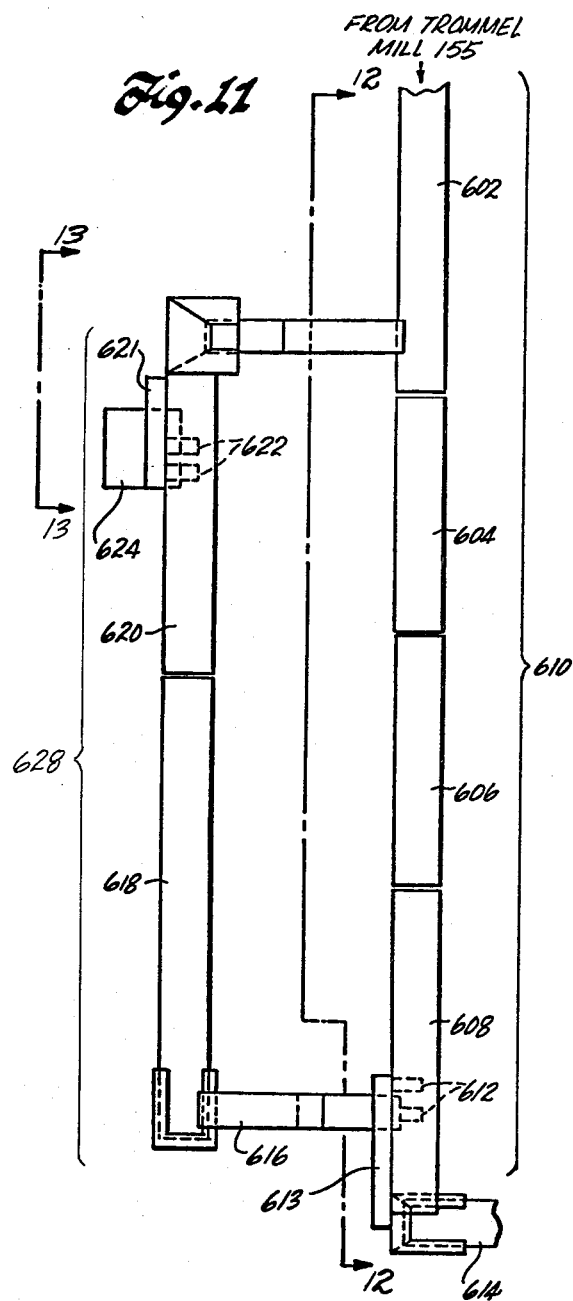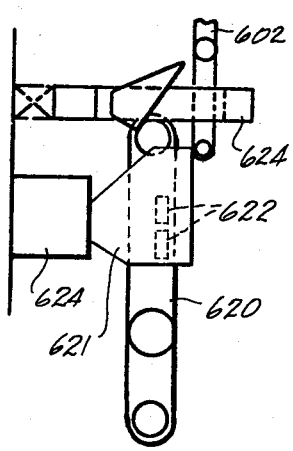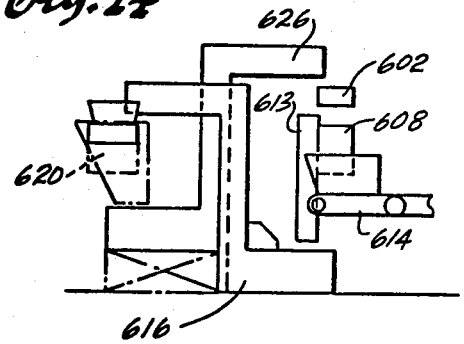

SOLID WASTE DISPOSAL SYSTEM

CROSS-REFERENCE TO RELATED APPLICATION

This application is a continuation-in-part of our copending patent application, Ser. No. 603,865 filed on Aug. 11, 1975 now abandoned.

BACKGROUND OF THE INVENTION

Immense, ever increasing quantities of solid wastes are generated each day which present major collection, disposal and nuisance problems. The cost of disposal of solid wastes ranks third amongst the cost of public schoolings, highways and general municipal expenses.

The quantity of trash that accumulates daily in large cities is truly staggering. It is estimated that each individual generates about 4 to 6 pounds of trash per day. Furthermore, the trash from industrial sources amounts to an equivalent of an additional 5 to 10 pounds per person per day. The average cost of disposal is approximately $5 to $10 per ton of trash.

Conventional methods of disposal, such as landfill and incineration, are becoming prohibitively expensive and are creating serious pollution problems.

Landfill areas for instance, are becoming increasingly fewer in number and further from the municipalities where the principal amount of trash is being generated.

SUMMARY OF THE INVENTION

According to the present invention there is provided a process and apparatus for the treatment of solid waste for recovery of values contained therein for recycle back to the economy.

The process for recovery of the values contained in the solid waste comprises a combination of steps. The first involves initially comminuting as-received the solid waste, typically by shredding, preferably to a particle size of about 3 to 4 inches or less. Magnetic ferrous metals contained in the comminuted solid waste are separated magnetically. The substantially ferrous metals free comminuted solid waste is classified by an upward flow of an elutriating gas therethrough, to separate the waste material into a substantially organic fraction and a substantially inorganic fraction. The substantially inorganic fraction is separated by particle size differential to form a glass-rich inorganic fraction and a non-ferrous metals rich fraction. Oversize particles are recycled for further comminution and reprocessing.

The first glass-rich fraction is comminuted to further reduce particle size. From this there is segregated a glass-rich grouping having a particle size in the range of about 20 to about 325 mesh. The glass-rich grouping in this particle size range is subject to froth flotation using a beneficiating amount of a flotation reagent for glass to obtain a float comprising predominately glass and an inorganics tailing. The glass is recovered from the float as a product and the tailing discarded as landfill.

In the preferred embodiment the non-ferrous metal fraction is subjected to a moving magnetic force field to upgrade and recover non-ferrous metals and leave an organic residue which is processed as part of the organic fraction.

The substantially organic fraction formed in the initial classification operation is dried and comminuted to a particle size less than about 5 mesh, preferably less than 8 mesh and subjected to flash pyrolysis. Flash prolysis consists of an operation wherein the dried, comminuted substantially organic fraction is combined with a particulate source of heat and a carrier gas which is non-reactive or non-deleteriously reactive with respect to the product of pyrolysis under turbulent flow conditions in a flash pyrolysis zone maintained at a temperature from about 600° to about 2000° F by the flow of the particulate source of heat therethrough. Carbon containing solid residue of pyrolysis, gases, and condensible pyrolytic oils are formed as the pyrolysis products. The carbon containing solid residue of pyrolysis and the particulate source of heat are recovered in admixture and subjected to at least partial oxidation to provide the particulate source of heat for recycle to the flash pyrolysis zone. The pyrolytic oils are condensed from the gas stream and the residual gases used in th process as transport and drying gases.

In the preferred flash pyrolysis operation, the source of heat is the carbon containing solid residue of pyrolysis by itself or with the particulate inorganic solid heat source formed from decarbonization of the carbon containing solid residue. The particularly preferred source of heat is particulate inorganic solid heat source formed from decarbonization of the carbon containing solid residue of pyrolysis.

In a further preferred embodiment of the invention, the dried substantially organic fraction, prior to further comminution, is subjected to classification to concentrate the organic fraction and form a second predominately inorganic fraction. The dried second predominately inorganic fraction is further classified into a glass-lean inorganic fraction which is discarded and a glass-rich fraction which is combined after degassing with the glass undergoing froth flotation. Classification is accomplished by vibrating the particles and simultaneously introducing an upward flow of gas which lifts the particles slightly.

The apparatus for carrying out the process of the invention includes means to initially reduce the particle size of the as-received solid waste material to a size consonant with separation by classification of the solid waste into the substantially inorganic and substantially organic fractions. This operation normally involves a shredding operation since, as indicated above, the particle size is fairly large. Following apparatus to initially comminute the waste material, there is provided a magnetic separator to remove the ferrous metals from the initially comminuted organic waste.

To form the predominately inorganic and organic fractions, there is employed an elutriation means, preferably a zig-zag classifier, the upward flow of a gas through which results in the formation of the predominately organic and inorganic fractions.

For the predominately inorganic fraction there is provided a means to separate particles by particle size differential, typically a trommel mill. This forms the glass-rich fraction and the non-ferrous metals fraction.

The glass-rich fraction is passed to a system for glass recovery which includes apparatus for froth flotation of glass. The apparatus consists of means to reduce the particle size of the glass to a particle size range conducive to froth flotation, operated in conjunction with floating cells to form the glass float and cells to wash the flotation reagent from the recovered glass.

To process the non-ferrous metals fraction there is provided a means to dispense the mass of solids onto a conveyor system which stagewise increases particle velocity to disperse the particles. A linear motor induces a moving magnetic force fieled to withdraw the non-ferrous metals from the conveyor and leave an organic residue.

For treatment of the substantially organic fraction there is provided means for drying and means to further comminute the dried organic fraction to a particle size less than 5 mesh. There is also provided a flash pyrolysis reactor associated with means to feed the dried comminuted organic materials, the particulate source of heat and the carrier gas thereto under turbulent flow conditions.

To process the product stream from the pyrolysis cyclone separators are used to separate carbon containing solid residue of pyrolysis and particulate source of heat from the resultant pyrolysis product stream and, as well, means to recycle the recovered mixture of carbon containing solid residue of pyrolysis and particulate source of heat to a burner which serves to totally or partially combust the carbon in the carbon containing solid residue to form a particulate source of heat for recycle to the pyrolysis zone. There is also provided means to partially cool the effluent gas stream from pyrolysis to condense pyrolytic oils and leave a residual gas stream for use as a transport and drying gas in the process or for discharge to the atmosphere.

Where the predominately organic fraction is processed following drying and before comminution to form a second glass fraction to be subject to froth flotation, there is employed an air table.

THE DRAWINGS

FIG. 1 schematically illustrates the overall process of this invention;

Figure 8:
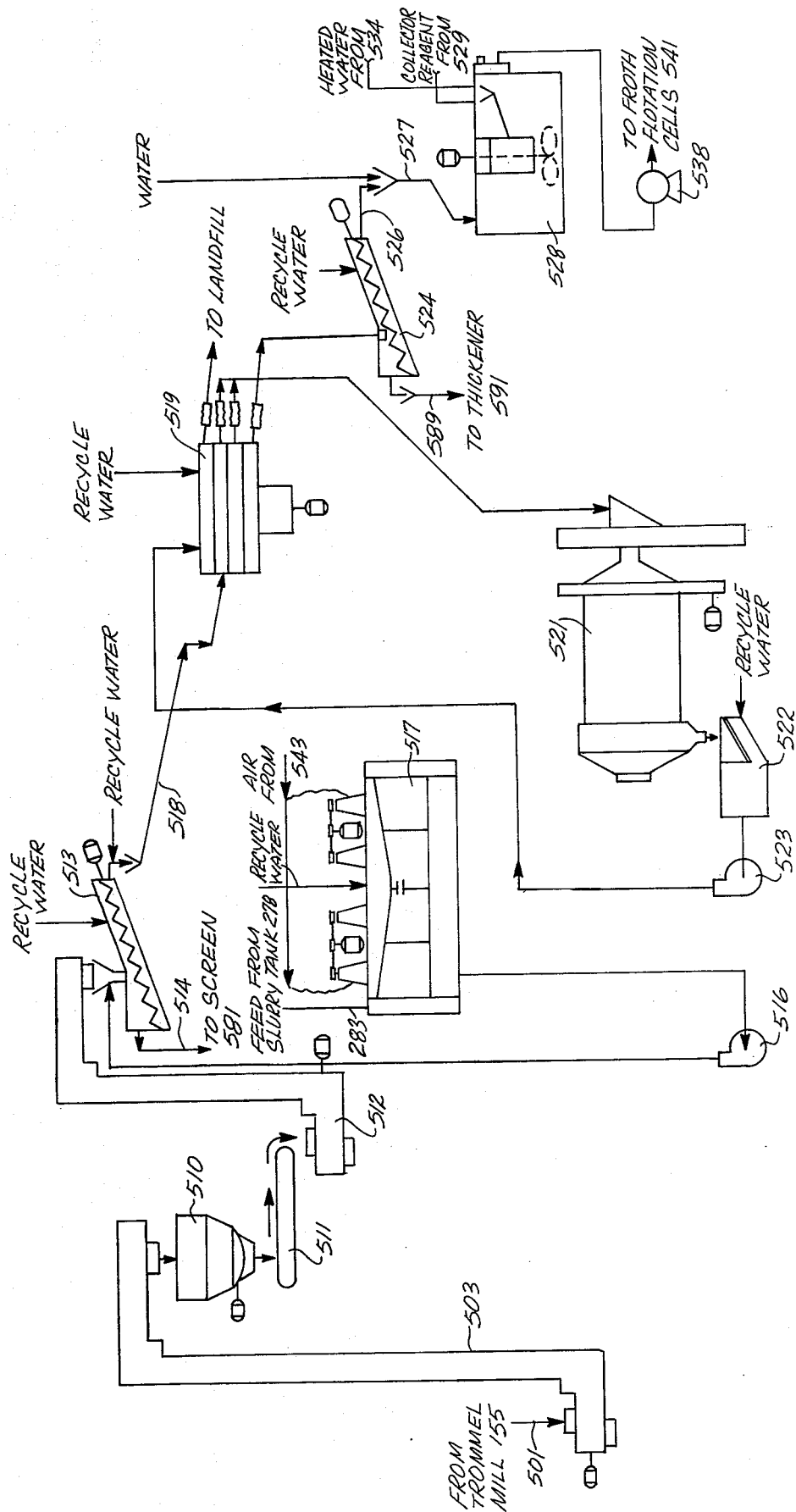
Figure 9:
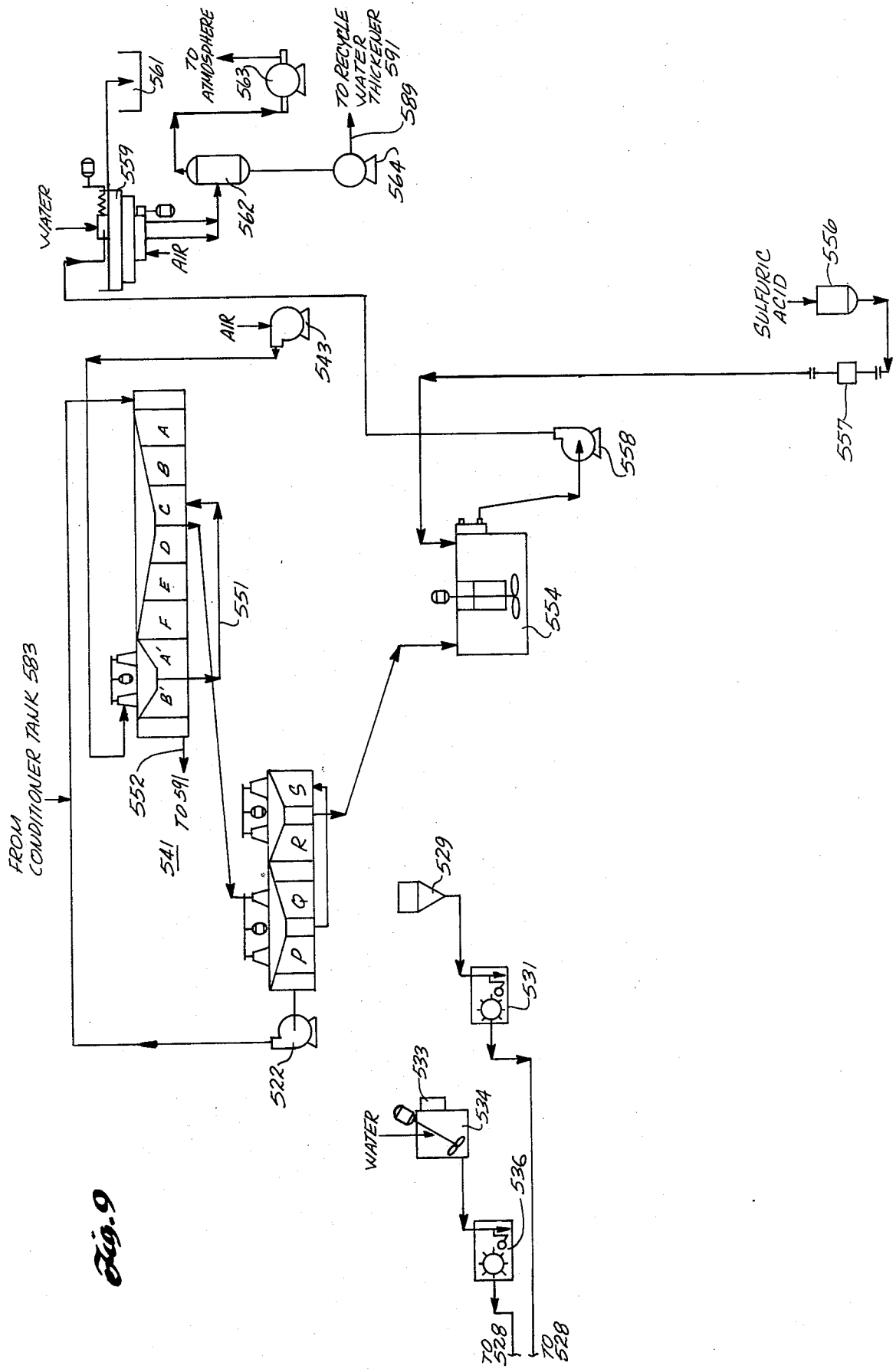
Figure 10:
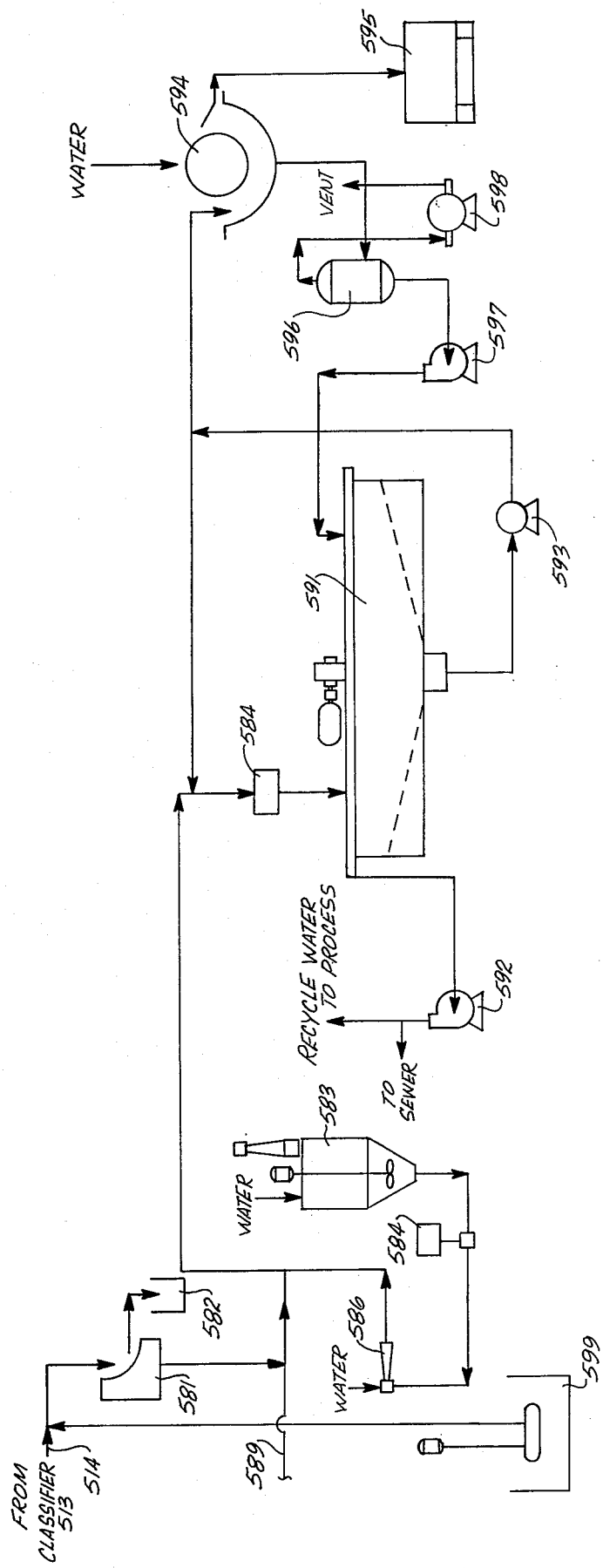

FIGS. 8, 9, and 10 illustrate the details of glass recovery operation;

FIGS. 11, 12, 13 and 14 illustrate the details of the non-ferrous metals recovery operation.

DETAILED DESCRIPTION

According to the present invention there is provided a totally integrated system for economical recovery of organic and inorganic values from solid wastes. The system consists of the following major operations: a refuse receiving and classification operation, pyrolysis feed preparation operation, a pyrolysis operation, a pyrolytic oil recovery operation, glass recovery operation and non-ferrous metals recovery operation. There also exists a ferrous metals recovery and detinning operation.

First the overall process will be discussed in general in terms of the overall operations, followed by a description of the details of each major operation.

The attached drawings are to be considered jointly and sequentially for understanding the sequence of operations which comprises the invention.

A. DEFINITIONS

As used herein, and in conjunction with the several processing operations described, the term "comminution" refers to any physical act of size reduction, including, but not limited to chopping, crushing, tearing, shredding, and grinding by suitable machinery.

By the term "classification" there is meant any operation which separates particles by density and/or particle size differential. The methods mainly employed are elutriation, i.e., lifting by an upward flow of gas and screening.

The term "organic solid wastes" means the predominately organic portion remaining after gross separation of the inorganic constituents from the as-received waste. Because of the several comminuting operations attendant to the gross separation, there appear in the organic solid waste fraction some inorganic particulate solids such as glass, metals and the like amounting to from about 5 to 8% by weight (dry basis) of the organic solid wastes. The inorganics are predominately glass. These inorganics, except for lost or removed fly ash, become a particulate inorganic solid heat source or "ash" formed upon decarbonization of the carbon containing solid residue of pyrolysis as described below.

The "organic" constituents of the organic solid wastes include cellulosic materials, plastic, rubber stock, and animal waste. Included in the meaning of "cellulosic materials" are paper, tree trimmings and bark, sawdust, crop waste, vegetable and fruit processing waste, and the like. "Plastics" include discarded household plastics, as well as the waste of industrial polymer forming and processing operations. "Rubber stock" includes waste tires. "Animal wastes" include household discards, slaughterhouse wastes, poultry processing wastes, manure, and the like.

Resulting from a generally sundry mixture of waste materials after gross separating substantially inorganic values, the organic solid waste may have, after drying to the extent required preparatory to a pyrolysis, the following typical analysis:

Table 1

| Constituent | % by Weight |
|---|---|
| Organics | 92.29 |
| Metals | 0.38 |
| Glass | 1.69 |
| Other Inorganics | 2.02 |
| Water | 3.62 |

The metals, glass and other inorganics constitute the "ash".

When the organic solid waste is pyrolyzed, there is formed a mixture of carbon containing solid residue of pyrolysis, termed herein "char", pyrolytic oils and gas. The gas includes transport gas and gases resulting from pyrolysis. The gas on a dry basis consists primarily of the oxides of carbon and hydrogen.

The carbon containing solid residue of pyrolysis, or "char", contains combustibles which are carbonaceous in nature, the main constituent of which is carbon, in intimate admixture with particulate inorganics. The carbon containing solid residue of pyrolysis, depending on the waste source, may contain from about 50 to about 70% by weight ash, the balance being carbon, with some bound hydrogen, nitrogen and sulfur being present. Bulk density of the char is from about 5.5 to 12.5 lbs./cu. ft.

The inorganic solid heat source or "ash" which is formed by decarbonization of the char and in contrast to the char has a bulk density between about 55 and 70 lbs./cu. ft. Its hard, glass like nature makes it an ideal heat source which may be readily generated from within the process itself. The ash has a sintering temperature between about 1400° and about 1700° F and a particle and skeletal density of about 150 lbs./cu. ft.

The "pyrolytic oils" formed, while varying in nature depending upon the composition of the waste material processed and pyrolysis conditions employed, are at the same time unique. They may be characterized as an oxygenated, complex organic fluid, typically up to 40% and in some cases up to about 90% soluble in water, acids or bases. Solubility in polar organic solvents such as glycerol is limited and the pyrolytic oils are relatively insoluble in non-polar organic solvents, such as diesel oil, carbon tetrachloride, pentane, decane, benzene, toluene and hexane. In spite of its immiscibility however, the pyrolytic oil can be successfully blended and mixed with various fuel oils, such as No. 6 or Bunker C. Combustion stability of the mixture is about the same as the fuel oil alone.

A typical example of an elemental analysis of the pyrolytic oil is that obtained from the pyrolysis of a waste material containing about 70% cellulosics. The oil thus obtained will contain from about 40 to about 60% carbon, from about 5 to about 10% hydrogen, from about 1 to about 2% nitrogen and from about 20 to about 40% oxygen. The empirical formula which best fits the pyrolytic oil analysis is $C_5H_8O_2$. Specific gravities range from about 1.1 to about 1.4.

By a "non-deleteriously reactive" carrier gas, there is meant a gas stream which is essentially free of free oxygen. Although constituents may react under non-oxidizing conditions with pyrolysis products to upgrade their value. To be avoided are constituents which degrade pyrolysis products.

B. OVERALL OPERATIONS

Figure 1:
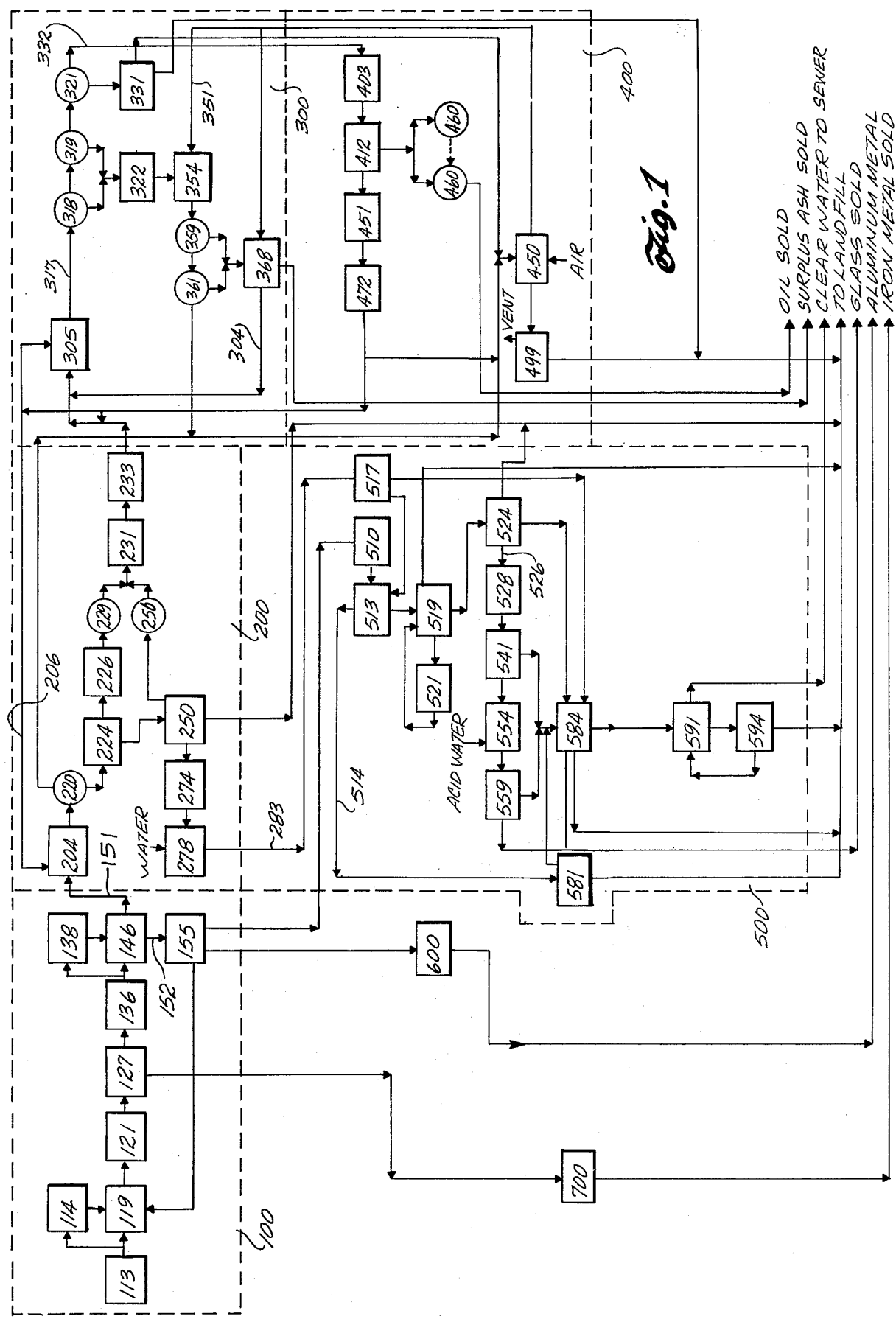

FIG. 1 shows schematically, the overall process for recovery of values from solid waste material. Refuse introduced to the refuse receiving and classification operation 100 is received at a refuse weighing station 113, and after weighing sent to a refuse storage pit 114 and/or directly fed into the process by feed conveyor 119. Refuse in the storage pit is eventually transferred to the feed conveyor 119 for feed to the process. From feed conveyor 119, the refuse is fed to primary shredder 121 where it is comminuted to a size less than about 4 to 3 inches to enable its eventual separation by classification into predominately inorganic and predominately organic fractions.

Ferrous metal in the refuse is separated from the comminuted refuse by a magnetic separator 127. The separated ferrous metal is then detinned in a detinning operation 700 in order to enhance the value of the product ferrous metal.

All or a portion of the ferrous metal free comminuted waste material then is directed by a flow splitter 136 to an air classifier 146. The waste material not transferred directly to the air classifier 146 is transferred to storage pit 138 for eventual feed to the air classifier 146. Air classifier 146 classifies the essentially ferrous metals free comminuted waste material into a predominately organic fraction passed by line 151 to operation 200 and a predominately inorganic fraction in line 152 for operations 500 and 600 by an upward flow of an elutriating gas through the waste material. The elutriating gas lifts the predominately organic portion from the predominately inorganic fraction.

The predominately inorganic fraction in line 152 is conveyed to a trommel mill 155 to size the inorganic fraction into three fractions. The over size material is returned to the primary shredder feed conveyor 119 for additional comminution and returned to the trommel mill.

The large particle fraction is conveyed to the non-ferrous metals recovery operation 600.

The third effluent stream from the trommel mill includes the smaller inorganic particles and contains predominately glass e.g., about 60% glass, amounting to over 50% of the glass in the solid waste. This stream is conveyed to storage bin 510 for further processing as part of the glass recovery operation 500 described in more detail below.

The predominately organic fraction in line 151 is then transferred to a dryer 204 in the pyrolysis preparation operation 200. Material is dried to about 4% or less by weight moisture content by the flow of a hot gas stream. The hot gas stream may be formed from combination of part of the gaseous hydrocarbon stream 206 resulting from pyrolysis of the organic fraction of the solid waste. Cyclone separator 220 separates the dried, predominately organic fraction from the hot gas stream. The hot gas stream is then burned in an afterburner 450 to rid the system of odors introduced by the wastes. The dried, predominately organic fraction may then be further classified in a screen classifier 224 where a major part of the inorganic constituents are removed to further concentrate the organic portion of the dried, predominately organic fraction. Some fine inorganics are retained to become part of the ash used for pyrolysis.

The concentrated, dried, predominately organic fraction is again shredded in secondary shredder 226 to a particle size of less than about 5 mesh, preferably less than about 8 mesh. The refuse is then separated from its carrier gas in a secondary shredder cyclone 229 and transmitted to a pyrolysis reactor feed storage bin 231 for eventual feed to the pyrolysis operation 300. A dispenser 233 is provided to break lumps of comminuted organics which form by compaction in bin 231.

The inorganic constituents of the dried, predominately organic fraction from the screen classifier 224 are further classified into a glass rich fraction and a glass lean fraction by an air table 250. After separating the lighter portion of the glass lean fraction, the lighter portion may be used for pyrolysis and the remainder used for landfill. Any light material lifted from the air table 250 by air is separated by air table cyclone 256 and also passed to the reactor feed storage bin 231 to become part of the organic constituent for the pyrolysis feed.

The glass rich fraction of the inorganic constituents is stored in a glass plant feed bin 274 for further processing in the glass recovery operation 500.

For the pyrolysis operation 300, the dried, predominately organic fraction is removed from the reactor feed storage bin 231 and passed by a screw conveyor through dispenser 233 which breaks up any large lumps which may have formed during storage. The shredded refuse is then picked up by a transport gas stream 304. The transport gas preferably is non-deleteriously reactive with pyrolysis products and is a portion of the gas resulting from the pyrolysis of the organic material.

The predominately organic fraction is then fed to pyrolysis reactor 305 where it is pyrolyzed in the presence of the transport gas, and a particulate source of heat, comprised of char, ash formed from decarbonization of char, and mixtures thereof. The particulate source of heat provides the heat needed for the pyrolysis reaction. Preferably, the ash product resulting from decarbonization of char is utilized as the particulate heat source.

The effluent stream 317 from the reactor comprises char, the particulate source of heat, and vapors containing condensible pyrolytic oil. The char and the particulate source of heat are separated from the vapor in three reactor cyclones 318, 319, and 321 in series. The char and particulate source of heat separated by the primary 318 and secondary 319 reactor cyclones are collected in a stripper 322. Residual hydrocarbons are stripped from the char and particulates in the stripper 322 by an upward flow of non-deleteriously reactive fluidizing-stripping gas therethrough.

The char is then at least partially oxidized in the presence of a source of oxygen, hot air, in line 351 from the afterburner 450. The particulate effluent from the char burner 354 is separated from its carrying gas in cyclones 359 and 361 in series, and collected in an ash surge hopper 368. At least a portion of the particulates in surge hopper are recycled through line 304 as the particulate source of heat to the pyrolysis reactor 305. The effluent gas after separation of entrained particulate matter by velocity reduction is passed through afterburner 450 to supply a part of the energy for heating the hot air fed to the char burner 354. Surplus ash and char in the ash hopper 368 are collected for sale.

The particulate char removed in the tertiary reactor cyclone 321 and collected in a fines well 331 is also recovered for sale or used as landfill. Any gas entrained fines may be burned in the afterburner 450.

The pyrolytic oil is separated from the gas in the oil recovery operation 400 by cooling in a quench stage 403, followed by decanting of the recovered pyrolytic oil in a decanter 412. The decanted oil is collected in one or more oil storage tanks 460 for sale as an energy source or for further refining to remove chemicals.

Any residual oil or water droplets entrained in the decanted hydrocarbon gas are recovered in a demister 451. The gas is then compressed by one or more compressors 472 and at least a portion of the compressed gas is used to provide a hot gas stream at a temperature of about 500° F for drying the predominately organic fraction in the dryer 204 and supplied to it by line 206. At least a portion is used as a transport and aeration gas in the pyrolysis operation 300. Any surplus gas not used for these purposes is discarded through afterburner 450.

Particulates from the afterburner 450 are removed by filtration in a bag house 499 before the effluent is vented to the atmosphere. The particulates recovered in the bag house are used for landfill.

Contemporaneously with pyrolysis there are conducted glass and aluminum recovery operations.

The glass recovery operation 500 comprises first forming a slurry of the glass rich fraction recovered from glass plant feed bin 274, in a slurry tank or mixer 278, then degreasing the glass in a degreasing stage 517, which exposes glass surface for attraction of flotation reagents.

The degreased glass is combined with the predominately inorganic glass rich fraction from the inorganic particle storage bin 510. This yields a slurry of a glass rich inorganic fraction.

A screw classifier 513 separates, by density differential, predominately organic, materials less dense than the water from the dense glass rich inorganic fraction to further concentrate the glass portion of the glass rich inorganic fraction. The stream 514 containing the material less dense than the water, is dewatered by a dewatering sieve 581 and sent to landfill. The waste water stream then flows to a magnetic flocculator 584.

The glass recovery operation uses froth flotation. In order to froth float glass, glass is to be of a particle size from about 20 mesh to about 325 mesh. To achieve this, the concentrated glass rich inorganic fraction is comminuted by a mill 521 until the particles are small enough to pass through the size 20 mesh of particle screen 519. Any particles smaller than about 325 mesh are removed in a second spiral classifier stage 524 and used as landfill. Water containing residual particulates is transferred to a recycle water thickener 591. Thus, the glass rich inorganic fraction in line 526 has a particle size less than about 20 mesh and greater than about 325 mesh.

To enable the froth flotation process, a beneficiating amount of a collector reagent, preferably an amine, which floats predominately glass is added to the glass rich inorganic fraction in a conditioning tank 528. A predominately glass fraction is then separated by froth flotation in a plurality of flotation cells 541 in series. Acid water is added to the glass in an agitated tank 554, and the glass separated from the aqueous phase in a filter 559 and recovered as a saleable product. The magnetic flocculator 584 receives the waste waters, from among other locations, flotation cells 541, the glass separator filter 559, as well as the water carrying the coarse material 514 less dense than water from the screw classifier 513, and water from the glass filter 559. The main fluid stream then passes through a thickener 591 where the flocculated ferrous metal particulates and other particulates are removed. The remaining settled particulates in the main fluid stream are separated from the liquid by a filter 594. The particulates are sent to landfill and clean, pollutant free water is recycled and in part discarded.

Area 600 is used for recovery of aluminum and other nonferrous conductive metals from the large particle fraction exiting trommel mill 155. This is accomplished in brief by providing a separator including a first group of conveyor belts serially aligned for conveying the trash mixture along a first path, each successive conveyor belt along the path operating at a higher linear speed than the previous conveyor belt to disperse the individual particles. A linear motor adjacent the highest speed conveyor belt provides a moving magnetic force field which deflects the conductive non-ferrous metal fraction of the mixture off to one side of the conveyor belt where it is transferred to a second group of conveyor belts parallel to but moving in the opposite direction to the first group. Each successive belt of the second group again has a higher linear speed than the previous conveyor of the group. A second linear motor adjacent the highest speed conveyor belt of the second group deflects the conductive metal fraction from the material on the second conveyor belt off one side of the conveyor belt where it is collected. The remaining fraction is returned to the start of the first conveyor belt for recirculation The non-conductive materials which are rejected from the system are discarded or returned for pyrolysis.

Area 700 is a detinning operation for the ferrous metals and is conventional in the art.

C. REFUSE RECOVERING AND CLASSIFICATION OPERATIONS

Figure 2:
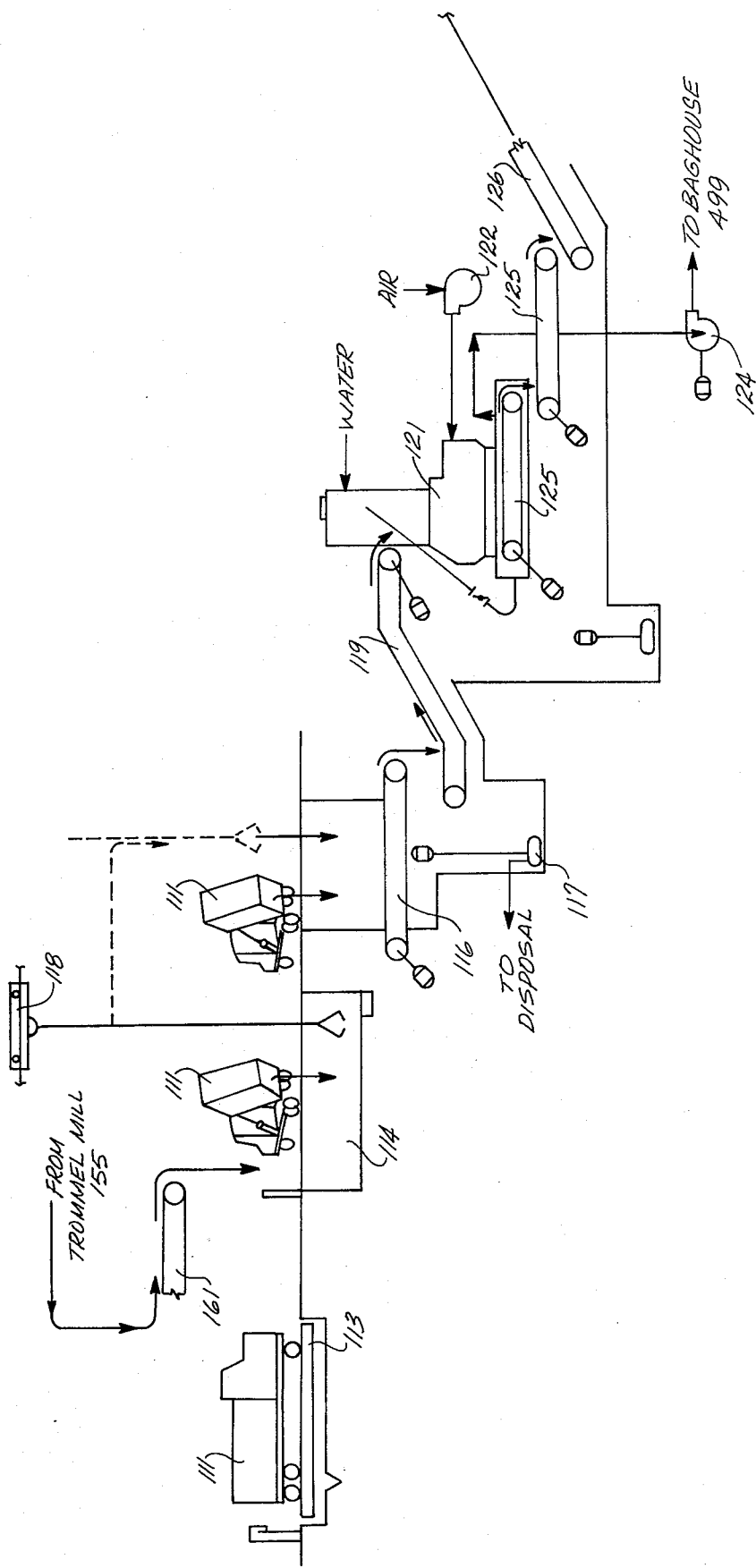
FIGS. 2 and 3 illustrate the details of the refuse recovering and classification operation.
Figure 3:
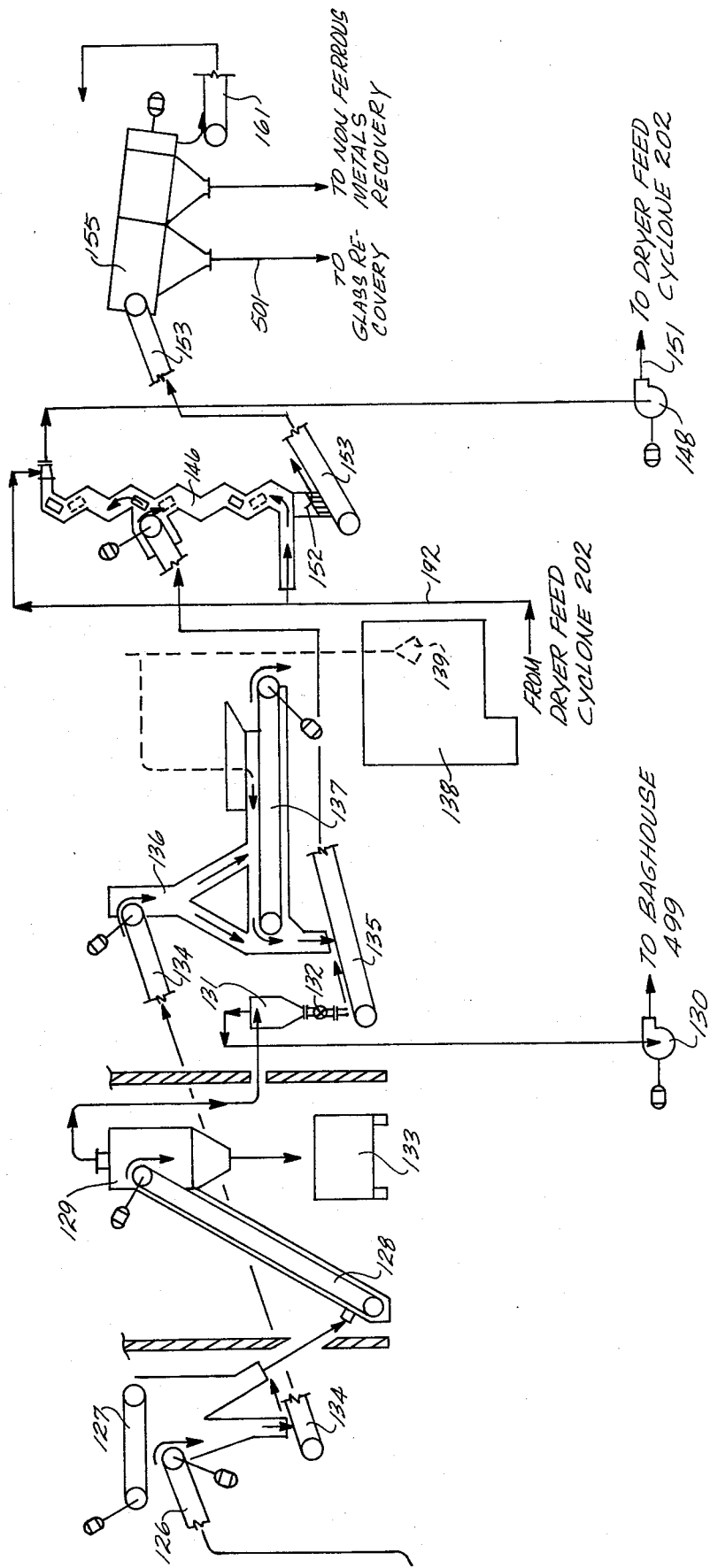

FIGS. 2 and 3 show the detail of the refuse receiving and classification operation 100. There is provided a waste collection storage and transfer area where dump trucks 111, or similar refuse transport units, are continuously employed to deposit waste material for processing and the recovery of the values contained therein. The trucks are weighed on an automatic truck weighing scale 113 before and after dumping to determine the weight of the refuse fed to the system. The waste is dumped either into a waste storage pit 114 or directly onto a dump pit conveyor 116 for transfer to the primary shredder 121. Rain water and other liquids are pumped from the area beneath the dump pit conveyor 116 by a sump pump 117 for eventual disposal. The refuse in the storage pit 114 is transferred to the dump pit conveyor 116 by a waste moving machine such as an overhead bucket loader 118. The dump pit conveyor 116 transports the waste material to the primary shredder feed conveyor 119 which dumps the refuse into the primary shredder 121.

The primary shredder 121 may be a ring grinder, attrition mill, impact mill, hammer mill or the like. A hammer mill is preferred. The shredder comminutes the waste independent of its makeup to a size suitable for classification into predominately organic and inorganic fractions. About 80% or more of the feed to the primary shredder is comminuted to a size of about 4 to about 3 inches or less.

Since the shredding operation generates heat, water may be sprayed into the shredder to prevent the organic matter in the refuse from igniting. In addition, air is blown through the shredder by a cooling fan 122 which cools the refuse. This air and some light fines produced during the shredding operations are sucked by a vent fan 124 and blown to the bag house 499 (FIG. 1) where the particles are filtered from the air before the air is vented to the atmosphere.

The comminuted refuse is carried from the primary shredder 121 by transport conveyors 125 onto a magnetic separation feed conveyor 126. The magnetic separator 127 separates a predominately magnetic fraction consisting of material such as shredded tin cans and the like from the refuse. The magnetic fraction is diverted to a conveyor 128 which carries the magnetic fraction to a receiving vessel 129 in which fine organic particles are withdrawn by the suction of a vacuum blower 130. The fine organic particles are separated upstream of the blower in a cleanup cyclone 131 and transferred via a rotary valve 132 onto the air classifier 146. The vacuum blower 130 discharges to the bag house 499. The magnetic fraction falls through the bottom of the magnetic fraction receiving vessel 129 into dump bins 133.

The comminuted, ferrous metals-free refuse is dumped by the magnetic separation feed conveyor 126 onto a transfer conveyor 134 which carries the refuse to a flow splitter 136 which directs all, some, or none of the shredded refuse to a shredded refuse pit feed conveyor 137 for storage in a shredded refuse storage pit 138. The remainder of the shredded refuse is transferred by the air classifier feed conveyor 135 to the air classifier 146. The refuse stored in the shredded refuse storage pit 138 is carried by an overhead bucket crane 139 or similar device to the shredded refuse pit feed conveyor 137, which is reversible, for transfer to the air classifier feed conveyor. The air classifier feed conveyor carries the comminuted refuse to the air classifier.

In the air classifier 146 there occurs a separation of the comminuted organic fraction from the inorganic fraction. Preferably, separation occurs by applying suction to the outlet of the classifier, the suction being generated by a suction blower 148 which draws air through the classifier to separate most of the moist organics from essentially all of the inorganics. Classifier 146 provides a "zig-zag" path for particle and air flow. The purpose is to impart a stop-start, tumbling motion to the particles with many different exposures to upwardly flowing air and the downward force of gravity. This results in elutriation of the organics fed to the classifier for transport via line 151 to the dryer feed cyclone 202 shown in FIG. 4. The transport air in line 151 is returned to the air classifier suction through the line 192 from the dryer feed cyclone 202, thereby forming a closed loop.

Alternately, separation can occur utilizing a positive blower (not shown) to blow an upward flow of air through the zig-zag classifier 146.

The predominately inorganic fraction from the bottom of the air classifier is collected on an air classifier discharge conveyor 153 and transferred to a trommel mill separator 155.

The trommel mill 155 separates the predominately inorganic fraction into three separate fractions based upon particle size: an oversize particle fraction, large particle fraction, and a small particle fraction. The oversize particle fraction e.g., particles greater than about 3 to about 4 inches, is returned via the trommel mill oversize conveyor 161 to the waste storage pit 114 for recycle to the primary shredder 121 for further comminution of the particles. The large particle fraction, e.g., in the range from 0.5 inch to about 3 or 4 inches which contains a proportionately high percentage of aluminum, is transferred to the non-ferrous metals recovery operation (FIGS. 11 to 14) which separates product non-ferrous metals mainly aluminum for sale. The small particle fraction, e.g., 0.5 inch and less, is conveyed to a storage bin 510 (FIG. 8) for further processing in the glass recovery operation 500 described below.

D. PYROLYSIS FEED PREPARATION

Figure 4:
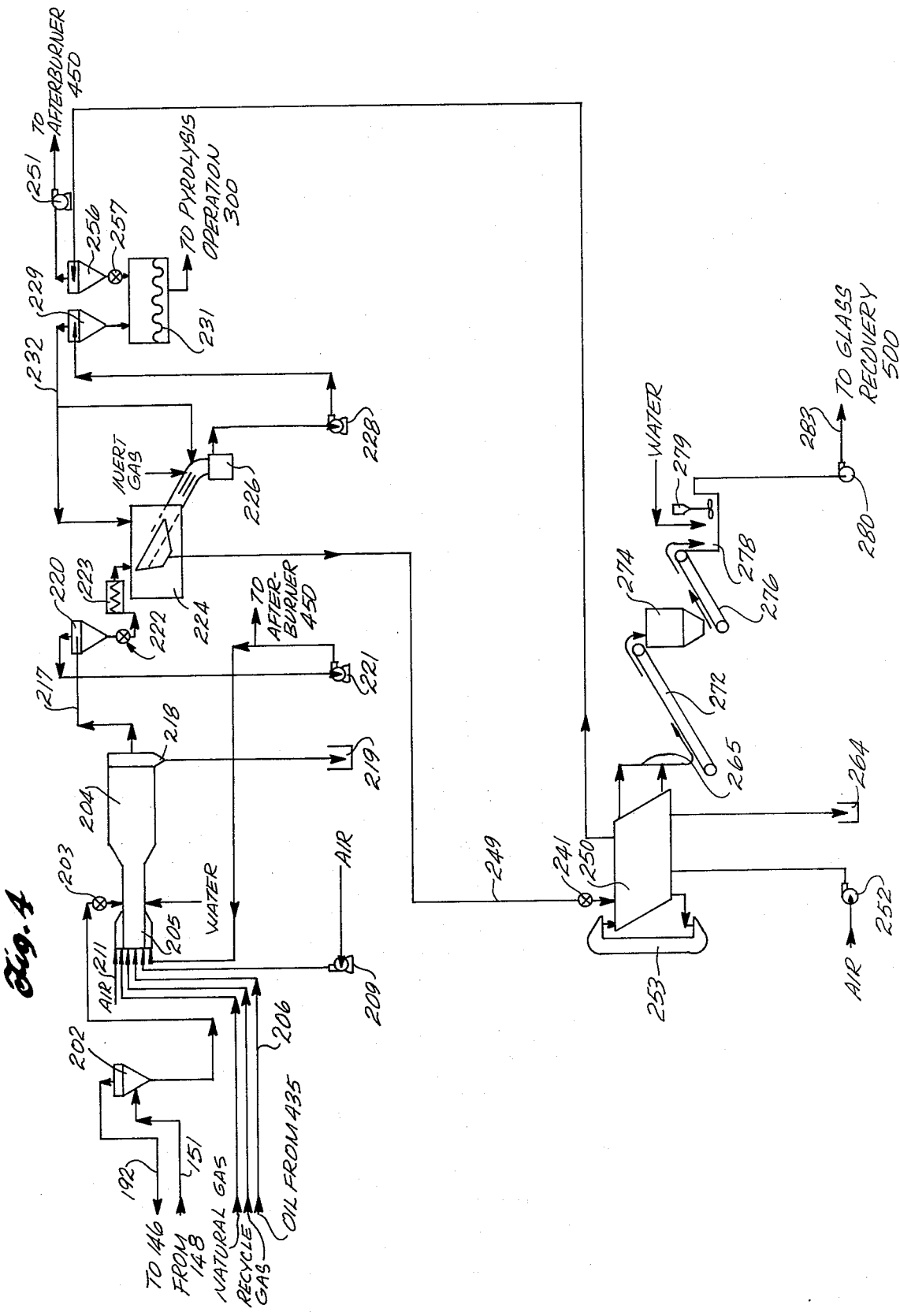
FIG. 4 illustrates the details of pyrolysis feed preparation.

FIG. 4 shows the steps of the organic feed preparation operation 200. The predominately organic fraction which is separated from its transport air in the dryer feed cyclone 202 is unsatisfactory for pyrolysis because it is moist with a typical moisture content of about 30%, and the particles are too large for efficient pyrolysis. In order to prepare the predominately organic fraction for pyrolysis, its moisture content is reduced, some of the residual inorganic material may be separated out, and the remaining particles are further comminuted.

First, the predominately organic fraction is fed via a rotary valve 203 to a dryer 204 where the wet organics are dried by heating them to a temperature of about 250° F by the flow of a hot gas stream through the material.

The dryer is typically a rotary drum dryer, but may be any of several configurations conventional in the art. The hot gas stream is produced in combustion chamber 205 of the dryer 204 by the combustion of a gas stream 206 which comprises a portion of the hydrocarbon gas formed as a consequence of pyrolysis of the organic refuse. In addition, natural gas, as well as fuel oil from a quench oil storage tank 435 (FIG. 6) are burned when extra heat values are required. Oxygen for combustion is supplied by air blown by a dryer combustion fan 209 and a makeup air stream 211. The hot gas stream has a temperature of from about 400° F to about 600° F, and preferably about 500° F.

Rocks and tramp metal in the dryer are collected in a drop leg 218 and transferred to a tramp metal bin 219 for disposal by landfill.

The dry, predominately organic fraction in the dryer effluent 217 is separated from the drying gas in a cyclone 220. The drying gases are vented to a dryer exhaust fan 221 which blows part of the gas back to the dryer and part of the gas to the afterburner 450.

The dry, predominately organic fraction in the cyclone is then conveyed by a rotary valve 222 and a conveyor 223 to a screenhouse 224 to separate the larger organic particles from any residual recoverable inorganic constituents, such as glass, which may have eluded classification in the primary air classifier 140. This serves to concentrate the organic portion of the predominately organic fraction. Since the density of the inorganic particles typically is greater than the density of the organic particles, the inorganics carried overhead in the air classifier 146 tend to be smaller than the organics carried overhead. Therefore predominately inorganic particles fall through the screen.

Figure 5:
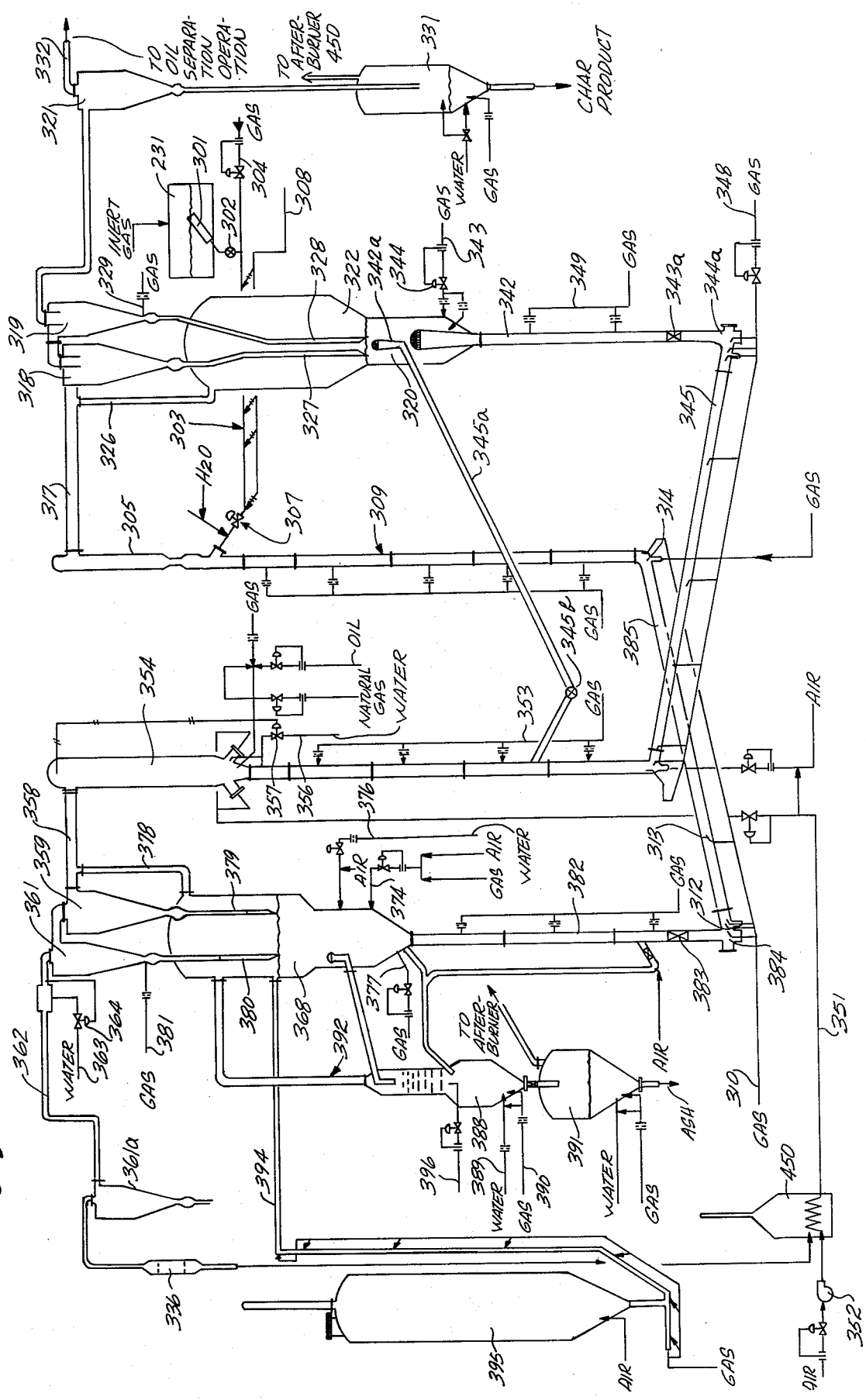
FIG. 5 illustrates the pyrolysis operation.

Th concentrated organic fraction is further comminuted in one or more secondary shredders 226 to a size of about 5 mesh, preferably less than 8 mesh to insure optimum pyrolysis in the pyrolysis reactor 305 (FIG. 5). Small particle size is important because small materials have a large surface area compared to their mass and these undergo complete pyrolysis in a short time. Inert or a non-deteriously reactive gas is used to transport the refuse through the secondary shredder. The secondary shredder can be water or gas cooled as required.

The comminuted, concentrated, predominately organic fraction is then blown by a secondary shredder fan 228 to a cyclone 229 which drops the refuse into a reactor feed storage bin 231. A portion of the gas stream 232 from the shredded refuse cyclone 229 is used to assist the inert gas in transporting the refuse through the secondary shredder 226 and the rest of the gas returns to the screen house 224.

The residual inorganics falling through the screen house 224 screen drop to a rotary valve 241 which conveys the particles to an air table 250. This stream 249 to the air table 250 typically contains about 25% glass by weight solids. The purpose of the air table is to separate the glass from the other inorganic materials. A typical air table, also referred to as a gravity separator, comprises a perforated platform with a series of riffles running lengthwise. The platform can be inclined in a single plane or in two planes.

In operation, the residual inorganics are placed on the high point of the platform, and the platform is vibrated in two directions. In one direction the vibrator has high acceleration and in the other direction a lower acceleration. Various forms of air tables known in the art can be employed.

Air is blown through the perforations of the air table 250 by an air table blower 252 to give the inorganics a slight lift. The light organic fines picked up by the air from the air table blower 252 are separated from the air stream in a cyclone separator 256, and are transferred via a rotary valve 257 to the reactor feed storage bin 231 for feed to the pyrolytic reactor. A fan 251 pulls the air out of air table cyclone 256 and blows it to the afterburner 450.

The heavier material generally follows the riffles along the length of the air table and falls off one end into a reject bin 264. This reject material is used for landfill.

The lighter material generally jumps the riffles and falls off on the side of the table opposite the heavier material. The light material stream 265, which typically contains over about 40% glass, is lifted by a conveyor 272 to a storage bin 274 for feed to the glass recovery operation 500 in which the majority of the glass is recovered. In order to convey this glass rich fraction to the glass recovery operation, it is conveyed by a weigh feeder 276 to a slurry tank 278 into which water is added, thereby forming a glass rich slurry of inorganic constituents. The slurry is continuously mixed by a tank mixer 279. This slurry is then transferred by a pump 280 to the glass recovery operation 500 via line 283.

Material fed to the air table which initially is not classified into the heavy or light fractions is partially recycled to the air table 250 by an elevator 253, and the remainder divested to landfill.

E. PYROLYSIS

FIG. 5 depicts in detail the pyrolysis operation 300. In this operation the organic solid feed is converted to form char, hydrocarbon gases, and pyrolytic oils.

With reference to FIG. 5 the comminuted, concentrated, dried predominately organic fraction in the reactor storage bin 231 is fed at a desired rate by a screw feeder 301 to dispenser (not shown) in line 303 which breaks up any agglomerated particles formed during storage and via a rotary valve 302 into the reactor feed transport line 303. The particulate feed is carried by a transport gas stream 304 into the pyrolysis reactor 305 through valve 307. The transport gas is non-deleteriously reactive with respect to pyrolysis products. Gas from line 308 aids transport of fluidized organic material as it is transported to the reactor 305. It is preferred that all of the gas used for the pyrolysis operation be a portion of the gases generated in pyrolysis reaction 305 and recovered in the oil recovery operation. Other non-deleteriously reactive gases may also be used.

Simultaneously with the introduction of the organic solid waste into pyrolysis reactor 305, there is introduced a particulate heat source along with its transport gas through vertical riser 309. The particulate heat source is a material capable of transferring heat to the organic solid waste to cause its pyrolysis into gases, pyrolytic oils and char. A preferred heat source is char. The inorganic heat source or "ash" formed from the decarbonization of the carbon containing solid residue of pyrolysis or "char" is a particularly preferred heat source because it is relatively attrition free and is of high bulk density, minimizing the height for the fluidized leg or standpipe 382 essential to continuous operation without backflow at the pressure differentials employed.

The pyrolysis reactor 305 is operated, depending upon the temperature and the nature of the particulate heat source, at a temperature from between about 600° F and the introduction temperatures of the particulate heat source. The reactor temperature is sustained essentially by the particulate heat source. Pyrolysis occurs primarily with liquefaction below about 1400° F and by gasification at temperatures above 1400° F. Where char is the source of heat, reactor temperatures will range from about 600° to about 2000° F. Where ash, in whole or in part is the heat source, the upper temperature limit is controlled by the fusion temperature of the ash, which typically is between about 1425°0 and 1450° F. Thus when ash, the preferred source of heat is used, an operating temperature between 600° and 1400° F is required. The preferred pyrolysis temperatures are between about 800° and about 1350° F. If necessary, pyrolysis temperature may be controlled by the addition of water, which is added with the organic feed.

In the pyrolysis reactor 305, heat transfer occurs primarily by a solid-to-solid radiation mechanism with some solid-to-gas-to solid convection and conductive heat transfer occurring. In general operation, the organic solid waste feed temperature is approximately 100° F. The preferred transport gas for both the organic solid waste and the particulate heat source is the gas resulting from the pyrolysis of the organic solid waste.

The pyrolysis occurs at some temperature intermediate of the temperature of the particulate heat source introduced into pyrolysis reactor 305 and the temperature of the feed. For maximum utilization of the particulate heat source, the transport gas for the particulate heat source should approach the particulate heat source's temperature.

The gas used to transport the particulate heat source is introduced, in part, by a plurality of oriented nozzles 312 projecting from transport gas line 310 at angle bend 384 beneath slide valve 383 of standpipe 382. Nozzles 313 project gas flow along angle riser 385 to carry the transported particles to the vertical riser 309. At this point, there is added secondary transport gas through a nozzle 314 which provides the final transport force to lift the solid particles under high flow rates to the pyrolysis reactor 305.

The nominal operating pressure of pyrolysis reactor 305 is about 11 to 12 psig. Residence time during pyrolysis is generally less than 10 seconds, preferably from 0.1 to 2 seconds, and more preferably, from about 0.2 to 1 second. The weight ratio of the particulate heat source to organic solid waste varies depending upon the temperature of the particulate heat source and the temperature desired in the pyrolysis reactor 305. Generally about 2 to about 20, preferably from about 4 to about 6 pounds of the particulate heat source per pound of the comminuted organic solid waste is fed to the pyrolysis reactor 305. To achieve intimate mixing, turbulent flow of the particulate feed source and its transport gas are required. Reynolds flow index numbers, therefore, will exceed 2000 with Reynolds numbers in excess of 100,000 frequently employed.

The solids in the reactor effluent stream 317 are separated from the vapor in three reactor cyclones 318, 319, 321 in series. The primary cyclone separator 318 is utilized primarily to separate the coarser particulates from the gas stream. The secondary cyclone separator 319 is employed to separate the finer particles from the gas stream. Most of the char and practically all of the ash are removed from the gas by the primary and secondary cyclones. The particulates from the primary 318 and secondary cyclones 319 drop into the constricted portion 320 of the stripper 322 which is at a preferred temperature of from about 900° F to about 1100° F.

The stripper 322 serves as both a stripper and as a well in which char and ash are accumulated. The stripping gas introduced through line 343a by control valve 344a at about 500° F cools the particles and removes any hydrocarbons from the particles which are not removed from the particles in the primary and secondary cyclones. The stripping gas and stripped hydrocarbons are combined with the effluent stream 317 from the pyrolysis reactor 305 upstream of the cyclones via line 326. Most particles entrained by the stripping gas lose velocity in the upper expended section of the stripper 322 and fall back into the fluidized mass of particles in the constricted zone 320.

In order to prevent any stripping gas from directly entering the cyclones, both the primary and secondary cyclones have long dip legs 327 and 328 respectively, which extend to or below the solid level in stripper 322. In addition, each dip leg has on its end a flapper valve to prevent backflow of gas. Also, a trickle gas stream 329 which seals off the reactor secondary cyclone dip leg 327 may be employed.

The finest particles in the effluent from the reactor are separated by the tertiary reactor cyclone 321 and drop into the fines well 331. In the fines well particles are quenched with cooling water to a temperature of about 350° F. These particles are almost exclusively char. The char is fluidized with a gas stream in the fines well 331 to permit easy withdrawal of the char fines as a product. The fluidizing gas is sent to the after-burner 450 where it is burned before it is vented to the atmosphere. The tertiary reactor cyclone vapor effluent stream 332, which contains gas, oil and water vapor, is passed to an oil separating operation 400, which is described below.

The char and the particulate heat source collect in zone 320 of the stripper 322 and are maintained at a predetermined height as part of fluidized leg 342 by the rate of solids withdrawal. Particles in zone 320 are mixtures of the pyrolysis heat source and char. Where the pyrolysis heat source is char alone, the content is essentially particulate char. Standpipe or fluidizer 342 extends into zone 320 of stripper 322 and serves to sample particles at an average composition and/or particle size, as described below.

In the instance where char alone is present, the larger char particles tend to gravitate towards the base and the finer towards the top, with particles representing a cross section of the particles in leg 320 being at the middle. Thus, the particles admitted to standpipe 342 tend to represent the average particle size of the particles in zone 320.

Where leg 320 contains product char and a different high density heat source such as ash, the heavier ash particles tend to gravitate towards the bottom and the lighter char particles towards the top. By mixing with the aeration gas, the particles at the point of sampling, represent composition wise, the average composition of the char and ash entering hopper 322.

If the extension of standpipe 342 into the stripper 322 were eliminated, the feed to standpipe 342 would tend to contain only large particles where char is the heat source or the heavier particles where a dense heat source is used in the pyrolysis operation. The point of sampling is, as shown, screened to reject clinkers.

There is provided in leg 320, sampling tube 342a and associated transport conduit 345a to cover the contingency that the char formed is fine and will not fluidize well with the particulate heat source. Where ash is the heat source this may result in a fuel deficiency in char burner 354. By opening valve 345b, light char will be combined with the heavier particles entering char burner 354 to supplement the available fuel.

The standpipe 342 in conjunction with a slide valve 343, controls the rate of feed of particles from the stripper 320 to the char burner 354. The particles dispensed through the slide valve 343 are transported by a nondeleteriously reactive transport gas around angle bend 344 and along angle riser 345 to vertical riser 346 where it is combined with a transporting flow of carrier gas or air for feed to char burner 354. Fluidized leg 342 serves as a pressure seal which provides through its height, a base pressure at valve 343 greater than the operating pressure of char burner 354. A pressure at valve 343 of about 1.5 to 3 times the operating pressure of char burner is desired to account for line losses. The typical operating pressure of the char burner is about 10 psig. The same is true for the pressure at valve 383 of fluidized leg or standpipe 382. Pyrolysis reactor 305 for this instance normally operates at a pressure of about 12 psig.

The cold ash angle riser 345 provides a seal between the hydrocarbon rich pyrolysis reactor side and the oxygen rich char heater side of the pyrolysis unit. The cold ash vertical riser 346 has a lower density of particulates than does the cold ash standpipe 342 so that there is a lifting effect on the circulating solid particles. This lifting effect occurs because transport gas 348 is fed into the angle bend 344, the angle riser 345, and the vertical riser 346. In addition, atmospheric air and a low density hot air stream in line 359 may be used as transport gas in the cold ash vertical riser. The hot air, which has a temperature of about 500° F, serves to decrease the density of the stream in the vertical riser 346 and thereby cause the fluo-solids transport of the circulating ash and char particulate matter. The hot air is produced by blowing atmospheric air with a blower 352 through the afterburner 450. In addition a gas steam 353 fluidizes the particulates in the vertical riser 346. On the other hand, only a fluidizing gas stream 349 is used for the particles in the standpipe 342.

In char burner 354, the particles used for pyrolysis are raised by partial or total oxidation to the temperature requisite for introduction to the pyrolysis reactor.

As soon as the ash and char mixture enters the char heater 354, it is met with oxygen containing hot combustion air from the afterburner 450, and natural gas and/or atomized oil if required. Oxidation of the char immediately begins. Residence time of the solids in the char burner 354 is from about 0.1 to 0.6 second. The char is oxidized and heated in the char heater from an entrance temperature to a temperature on the order of from about 1300° F to about 1700° F depending upon whether partial or total oxidation occurs and upon the sintering temperature of the ash if ash is to be formed.

Where ash is to be employed as the heat source, the char burner 354 must be maintained at a temperature below the sintering temperature of the ash formed as a consequence of oxidative decarbonization of char. In that case, combustion in the char burner 354 is from about 80 to about 100% complete, to form an ash which is at least 90% carbon free. Sufficient air is introduced to achieve this end. To control combustion temperature, a water stream 356 is introduced along with sufficient air to atomize the water. The water is vaporized to uniformly absorb the heat of combustion. In the instance of the use of ash as the heat source, the char burner is maintained at a temperature between about 1350° and about 1400° F. Water requirements are maintained and controlled by a temperature controlled valve 357.

The effluent stream 358 from the char heater contains particulates and gas. The particulates are separated from the gas in primary 359 and secondary 361 char heater cyclones which are in series. The temperature of the effluent flue gas stream 362 from the secondary char heater cyclone is maintained at about 1350° F with a cooling water stream 363, the rate of which is controlled by a temperature controlled valve 364. The flue gas passes through an orifice chamber 336 and is then burned in the afterburner 450 where the heat value of the flue gas is used to heat the hot air stream 351 used for the reaction in the char heater 354.

Any fines are removed in cyclone 361a prior to feed of the gas to afterburner 450.

The hot particulates separated from the char heater effluent stream 356 drop into an ash hopper 363 for eventual feed into the pyrolysis reactor 305 as the hot ash circulating stream. The ash hopper 368 serves two purposes. First, it insures that all the char formed in the pyrolysis reactor 305 is completely burned to ash. When the char combustion in the pyrolysis reactor is not 100% complete, air is introduced in line 374 into the ash hopper 368 for complete burning. Since this further combustion of the char is exothermic, an atomized quench water stream 376 is added to maintain the temperature of the ash in the ash hopper as its desired temperature. When char is completely burned to ash in the char heater 341, air injection is not required and the ash particles may agglomerate. Therefore a fluidization gas stream 377 is injected into the ash hoppr to permit easy removal of the ash from the hopper and to pevent the hot ash particles from agglomerating.

Any gas or air in the ash hopper is transferred to the char heater effluent stream 358 via line 378. In order to prevent gas or air in the ash hopper 363 from directly entering the bottoms of the cyclones, both the primary and secondary char heater cyclones have long dip legs 379 and 380 respectively, which extend to the ash level in the ash hopper. In case too much fine particles are accumulated in the circulating system, the burner side secondary cyclone 361 is sealed off by injecting a small amount of gas 381 into the bottom of the cyclone. This seals off the secondary cyclone dip leg 380 and eventually blows out the fine particles from the system.

The other function of the ash hopper 368 is to provide surge capacity for the circulating solid particles before they are returned to the pyrolysis reactor.

Hot solid particles from the bottom of the ash hopper 368 are transferred to the pyrolysis reactor 305 via a hot ash standpipe 382, a hot ash slide valve 383, a hot ash angle bend 384, a hot ash angle riser 385, and the hot ash vertical riser 309. Gas is used to transport and fluidize the circulating ash solid. The hot ash slide valve 383 controls the flow of hot ash and shuts down rapidly in case there is any backflow of hot ash. This shutting down is done to prevent a possible explosion due to the mixing of the oxygen in the char heater 354 and the hydrocarbon feed to the pyrolysis reactor 305.

Net product ash is withdrawn from the ash hopper 368 and transported to an elutriation and quench drum 388. The hot ash product, which is at about 1350° F in the ash hopper is quenched to about 350° F in the quench drum by cooling water from line 389. The elutriating function of the elutriator and quench drum is decribed below. The ash in the quench tank is fluidized with a gas stream 390 as required. The preliminary quenched solid product in the elutriator and quench tank is fed into a trim cooler vessel 391 into which additional cooling water and fluidizing gas are fed. The ash in the trim cooler is cooled to about 200° F and then withdrawn for disposal. Gas along with entrained particles flow from the elutriator and quench drum 388 to the ash hopper 368 via a connecting line 392. Gas from the trim cooler 391 is sent to the afterburner 450. The stored ash in the ash storage tank 395 is used for start up.

The ash storage tank 395 is fluidized with air, and the ash storage transfer line 394 is fluidized with gas.

The density of the circulating ash in the hot ash standpipe 309 is from about 55 to about 65 pounds per cubic foot. This is higher than the density of from about 35 to about 45 pounds per cubic foot in the cold ash standpipe 342, and provides a driving force which causes the circulation of the ash particles. This density differential results from the presence of relatively low density char and fines in the cold ash.

The density and particle size distribution of the hot ash from the hot ash hopper are controlled by two schemes. First, when the particles have too many fines, the density of the ash is decreased, and less ash is withdrawn for feed to the pyrolysis reaction. This causes the ash hopper bed level to rise which increases the level of ash in the dip leg 380 of the secondary char heater cyclone 361 and causes the cyclones to send fine particles out with the flue gas stream 362 to the afterburner. This tends to increase the density of the particles in the ash hopper.

Second, if the circulating particles have too few fines, thereby causing the density of the circulating particles to be too high, the elutriation section of the elutrator and quench drum 388 is used. Gas is fed through line 396 to elutriate the fine particles and return them to the ash hopper via the connecting line 392. Thus, primarily coarse ash particles are withdrawn as product ash from the ash hopper and this decreases the density of the circulating ash particles.

In summary, what has been described is a system which takes organic matter and pyrolyzes it to produce char, ash, hydrocarbon gases, oil, and water. Pyrolysis takes place in the presence of an inert gas and hot circulating particles wherein the circulating particles are produced by the pyrolysis reaction. The circulating particles are reheated by the combustion of the product char to ash, the combustion of at least part of the product hydrocarbon gas, and if required, the combustion of fuel oils in the presence of air. Surplus ash produced by the pyrolysis reaction is quenched and withdrawn as a product steam. The product hydrocarbon gas is treated in the oil recovery operation 400 described below.

F. PYROLYTIC OIL RECOVERY

Figure 6:
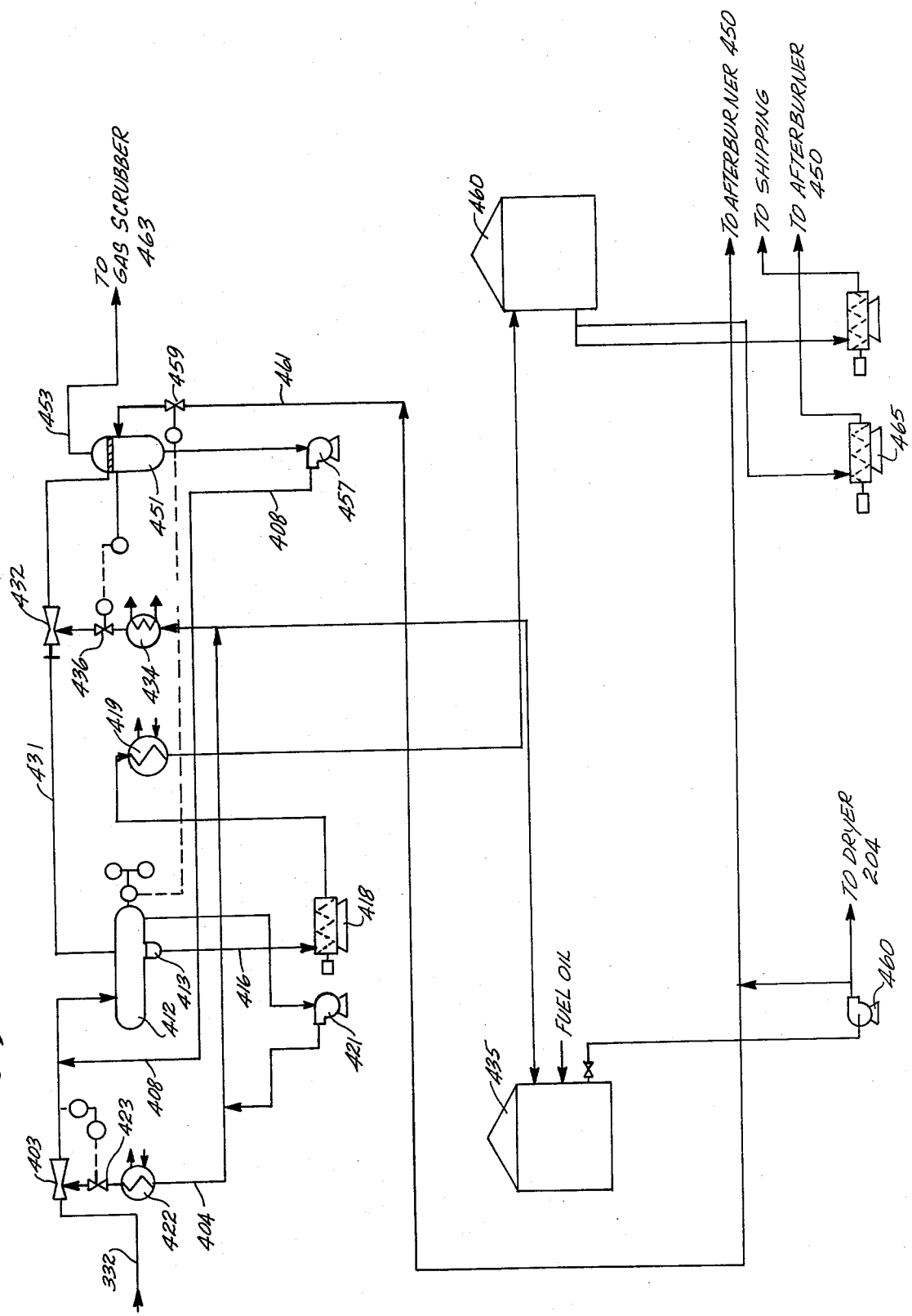
FIGS. 6 and 7 illustrate the details of the pyrolytic oil recovery operation.
Figure 7:
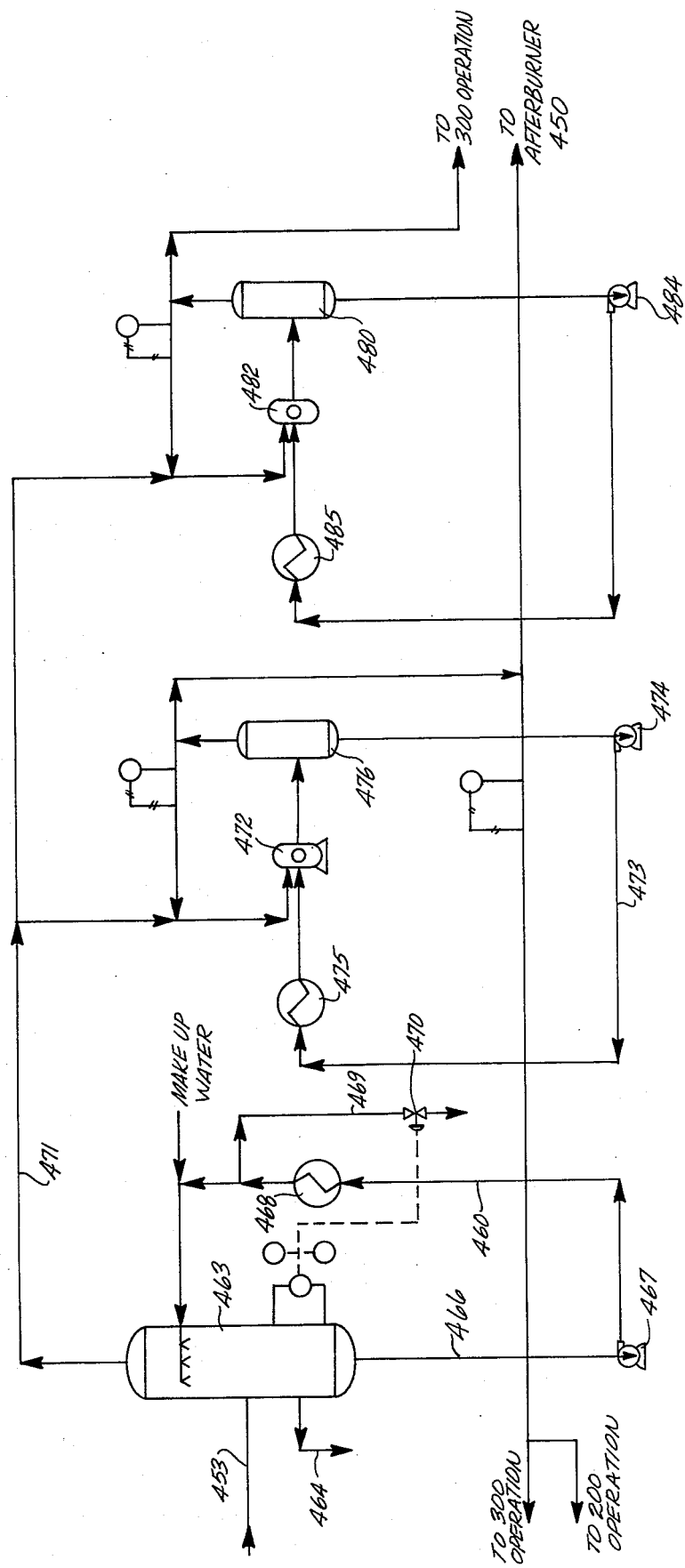

FIGS. 6 and 7 depict the steps of the pyrolytic oil recovery operation. Referring to FIG. 5, the gas stream 332 from the tertiary reactor cyclone 321 is cooled with circulating quench oil stream 404 from a temperature of about 950° F to about 175° F in a quench venturi 403. The quench oil is maintained at a temperature of about 120° F by a heat exchanger 422 using cooling water. The flow rate of the quench oil to the venturi is controlled by a temperature controller valve 423. The cooled gas stream is further cooled by the addition of about two pounds decanter quench oil stream 408 per pound of product gas.

The cooled gas then enters an oil decanter 412 which has a dip leg 413 for accumulation of product oil. A product oil stream 416 is withdrawn from the dip leg and pumped by a product oil pump 418 through a product oil cooler 419 which reduces the product oil temperature from about 175° F to about 140° F, and then one or more product oil storage tanks 460.

The product oil in the oil storage tanks 460 is transferred by a pump 463 to shipping for sale. In addition, the product oil is transferred by an afterburner fuel pump 465 to provide heating value for the afterburner 450.

The pyrolytic oils formed, while varying in nature depending upon the composition of waste material processed and pyrolysis conditions employed, are at the same time unique. They may be characterized as an oxygenated, complex organic fluid, typically up to 40%, and in some cases up to 85%, soluble in water, acids or base. Solubility in polar organic solvents such as glycerol is limited. The pyrolytic oils are relatively insoluble in non-polar organic solvents, such as diesel oil, carbon tetrachloride, pentane, decane, benzene, toluene and hexane. The pyrolytic oil, however, can be successively blended and mixed with various fuel oils such as No. 6 oil. Combustion flame stability when firing the mixture is about the same as when firing fuel oil alone.

A typical example of an elemental analysis of the pyrolytic oil is that obtained from the pyrolysis of a waste material containing about 70% cellulosics is as follows: about 40 to about 60% carbon, from about 5 to about 10% hydrogen, up to about 2% nitrogen and from about 20 to about 40% oxygen. The empirical formula which best fits the pyrolytic oil analysis is $C_5H_8O_2$. Specific gravities range from about 1.1 to about 1.4.

The quench oil and decanter oil used to cool the gas are withdrawn from the decanter 412 by a quench oil pump 421 for use in two places in the oil recovery operation. As described above, a portion of the quench oil is cooled by the quench oil cooler 422 to a temperature of about 120° F and then serves to quench the gas stream 332 in the quench venturi 403. The rest of the quench oil is used to further cool the gas stream in a second venturi 432 as described below. Any excess quench oil is sent to a quench oil storage tank 435 via line 438.

Any remaining condensible pyrolytic oil in the gas effluent stream 431 from the decanter is condensed by further cooling of the gas in the second venturi 432 to a temperature of about 160° F with a part of the quench oil from the quench oil pump 421. This quench oil is cooled to a temperature of about 120° F. by a demister quench oil cooler 434. The flow of this quench oil stream 433 is controlled by a temperature control valve 436.

After undergoing this second cooling step, oil droplets are recovered from the product gas in a demister pot 451. Oil removed in the demister 451 is pumped by a demister quench oil pump 457 through line 408 to cool the gas stream discharged from the quench venturi 403, as described above.

FIG. 7 shows the steps used to prepare the product gas stream 453 from the demister 451 so that it can be returned to the shredded refuse feed preparation operation 200 and pyrolysis operation 300 for transport, aeration, and drying.

First, water and inorganic impurities are removed in a gas scrubber 463. A circulating water stream 466 which is pumped by a scrubber water pump 467 through a scrubber water cooler 468 to the scrubber and then back to the pump, scrubs the water and inorganic impurities from the gas. In addition, the scrubber serves to reduce the gas temperature from about 160° F to about 130° F. The scrubber water cooler 468 reduces the temperature of the circulating water which is heated up because of contact with the hot gas. The level of impurities in the circulating water is maintained at a low level by adding fresh make up water and withdrawing sour water 469. The flow rate of the sour water is controlled by a level control valve 470 which senses the liquid level in the scrubber 463. A waste oily water stream 464 is drained from the scrubber to a catch pot.

The scrubbed gas stream 471 has a temperature of about 130° F and a pressure of about 1 psig. Part of the gas is heated to about 200° F and compressed to a pressure of about 30 psig by a low pressure compresser 472. The rest of the gas is heated to about 200° F and compressed to a pressure of about 60 psig by a high pressure compresser 482.

The low pressure compresser has a circulating seal water system wherein seal water stream 473 is pumped by a water pump 474 through a seal water cooler 475 to the low pressure compresser 472. The low pressure gas is separated from the water in a separator vessel 476.

Likewise the high pressure compresser has a circulating seal water system comprising a pump 484, a high pressure seal water cooler 485, and a separator vessel 480.

The low pressure gas is sent to the pyrolysis operation 300 where it is used for transport and aeration. It is also sent to the shredded refuse feed preparation operation 200 where it is used for aeration, transport, and drying of the organic feed. Any excess low pressure product gas is burned in the afterburner.

The high pressure gas is returned to the pyrolysis operation 300 where it is used for aeration and transportation.

G. GLASS RECOVERY

FIGS. 8-10 show the steps of the glass recovery operation 500. Referring to FIG. 8, the glass stream 501 from the trommel mill 155 is carried by a conveyor elevator 503 to the glass plant feed storage bin 510. The glass plant feed storage bin has a live bottom so that the glass is vibrated onto a weigh feeder 511 which controls the rate of glass feed to the glass plant. From the weigh feeder the glass is lifted by a conveyor elevator 512 to a spiral classifier 513. Joining the glass plant feed at the spiral classifier 513 is the glass plant feed slurry stream in line 283 from the slurry tank 278 in the organic feed preparation operation 200. Before the stream is pumped to the spiral classifier by pump 516 it is cleaned and degreased in a degreaser stage 517 with recycle water and air.

The lighter organic particles fed to the spiral classifier 513 are washed out the bottom of the classifier by a recycle water stream and are carried in line 514 to a screen 581 which screens out the particles which are then used for landfill.

Recycle water washes the main glass stream 518 form the first spiral classifier 513 to a vibrating screen separator 519. In the separator all particles less than 20 mesh are removed, large particles are separated for further comminution and particles greater than about ¼ inch are disposed of as landfill. This vibrating screen works in conjunction with a rodmill 521. The purpose of this combination is to reduce the particle size of the glass to a size suitable for purification of the glass by froth flotation. Thus glass larger than about 20 mesh enters the rodmill recycle tank 522. From this tank a glass slurry stream is returned by a pump 523 to the vibrating screen and those particles which are comminuted to a size less than about 20 mesh are carried to a second spiral classifier 524. Recycle water is added to the rodmill discharge tank 522 to maintain an adequate supply of water in the loop to the vibrating screen.

Comminution devices other than a rodmill may be used, including gyratory crushers, cone crushers, hammermills, cage mills, roll crushers, and the like. A rodmill is preferred because it is particularly satisfactory for breaking friable or brittle materials, including large glass particles, into small fragments which pass through the subsequent screening operation, while the more ductile materials are flattened for separation by screening.

The second spiral classifier 524 serves to eliminate particles which are too small for satisfactory froth flotation. Recycle water is used in the second spiral classifier to wash particles less than about 325 mesh into a recycle water stream 58 flowing to the recycle water thickener 591, shown in FIG. 10. Thus the effluent stream 526 from the top of the spiral classifier has a particle size between about 20 mesh and about 325 mesh, a size distribution which is optimum for froth flotation. This stream is washed by water into an agitated conditioner tank 528.

A beneficiating amount of collector reagent with or without frothing agent and/or extenders are added to the conditioner tank 528. With reference to FIG. 9, the frothing agent is pumped from a storage tank 529 by a metering pump 531. The collector reagent with water is heated by an immersion heater 533 to about 100° F in an agitated tank 534. The flow rate of collector reagent to the conditioner tank 528 is controlled by a metering pump 536.

The beneficiating collector reagent typically may be an amine or a mixture of amines which, for reasons of economy, may be extended using conventional hydrocarbons such as kerosene, mineral oil, fuel oil and the like. The typical frothing agent is a material such as pine oil, methyl isobutyl carbinol, methyl glycol ether, and the like, as are generaly known to the art.

The amine flotation reagents which may be used in accordance with the present invention, are not narrowly critical, and are generally obtained by the reaction of a lower molecular weight amine with a straight or branched chain alkene; a straight or branched chain alkene; a saturated or unsaturated or hydroxylated fatty acid or a hydrocarbon containing additional secondary or tertiary amine groups.

Illustrative but no wise limiting of the amines which may be used as selective flotation reagents for the separation of particulate glass from a comminuted mass of inorganic matter, there may be mentioned tallowamine acetate; N-hexadecylamine acetate; N-octadecylamine acetate, laurylamine acetate; primary amines derived from cocoa fatty acids, tallow fatty acids, soya fatty acids, castor fatty acids, oleylamine acetate; dihydroabietyl amine, primary tallow amine hydrochlorides cotton-seed oil amine hydrochlorides, N-oleyl-1,3-propylene diamine; N-tall oil-1,3-propylene diamine; N-tallow oil-1,3-propylene diamine and the like.

Other amines which may be used as flotation reagents in accordance with the practice of this invention there may be mentioned the condensation products of tall oil and diethylene triamine, dicocoamine, the reaction products of tall oil and dimethylamine propyl amine, tricocoamine, trilaurelamine, and the like.

The purified glass stream from the recleaner flotation cells flow into an agitated tank 554 where the froth is broken and glass is washed wih acidic water from sulfuric acid tank 556 pumped by pump 557.

The glass slurry is then transferred by a centrifugal pump 558 to an air agitated, water washed, product glass vaccum filter 559. In this filter the glass is separated from the water stream. The purified glass flows into tote bins 561 for eventual sale. The water from the vacuum filter enters a filtrate receiver 562 where any of the air in the froth is sucked away and vented to the atmosphere by a vacuum pump 563, and the water is transferred by a pump 564 to the recycle water thickener 591.

The predominately glass fraction with conditioner is transferred by a pump 538 to a series of froth flotation cells 541. Air is blown into the cells by blower 543 to form the froth.

The glass slurry enters the rougher cells, A–F, and then flows to cleaner cells P,Q, and recleaner cells R,S. The essentially glass free particulates in the rougher cells sink to the bottom and enter the scavenger cells A' and B'. Any residual glass in the scavenger cells floats to the top and is carried by line 551 to the rougher cells. Excess water and non-floating particulates flow from the bottom of the scavenger cells through line 552 to the recycle water thickener 591. The nonfloated fraction from the cleaner flotation cells P, Q are transferred by a froth flotation transfer cell pump 522 to the rougher flotation cells A–F.

The disposition of the waste water and recycle water 589 streams is depicted in FIG. 10. The waste water stream from the first spiral classifier 513 is combined with the recycle water stream 589 after the particles in the waste water are separated out in screen 581 and dropped into a tote bin 582. A flocculating agent is combined with utility water in an agitated tank 583 and pumped by a metering pump 584 to a venturi 586 where additional water is added. The flocculating agent and utility water are then combined with the recycle water stream 589.

The recycle water stream 589 with the flocculating agent flows through a magnetic flocculator 584 which flocculates the ferrous particles. The flocculated particles and other heavy particles settle to the bottom of a recycle water thickener 591. Clear water is removed from the top of the thicken and returned by a recycle water pump 592 to the process for use wherever recycle water is used, as described above, thereby producing a closed recycle water loop. Any excess water is transferred to the plant sanitary sewer system.

The bottoms in the thickener 591 can contain a high percentage of particles. The bottoms are pumped by pump 593 through a filter 594 and sludge is filtered out and collected in tote bins 595 for landfill. The filter 594 is washed with water. The water stream from the sludge filter 594 enters a receiver tank 596 from which it is pumped back by pump 597 to the recycle water thickener 591 for storage and reuse. Any gas of air in the recycle water in the receiving tank 596 is removed by a vacuum pump 598.

Water entering the pump sewer system such as spillage enters a water collection sump 599 in which most of the particulate matter settles to the bottom. Relatively clear water is pumped from the sump to the dewatering sieve 581 and to the thickener for further purification and use in the recycle water system. The particulates settled to the bottom of the sump are removed by a vacuum truck (not shown).

H. NON-FERROUS METALS RECOVERY

FIGS. 11 to 14 illustrate the details of the non-ferrous metals recovery operation 600.

Referring to FIGS. 11 to 14 in detail, there is shown a conveyor system including an input conveyor belt 602. The conveyor belt is preferably made from heavy fabric or rubberized cord materials. The large particle fraction from trommel mill 155 is conveyed by the input conveyor 602 at a linear speed determined by the throughput rate of the system, for example, on the order of 150 to 200 feet per minute (fpm).

The particles are transferred onto the first of a group of aligned belt conveyors in series, indicated at 604, 606, and 608 respectively. These conveyors are each in the form of an endless belt, with each successive belt in the group being driven at a higher linear speed than the previous belt. By way of example only, the linear speed of the conveyor 604 may be 200 fpm., the linear speed of conveyor 606 may be 400 fpm., and the linear conveyor 608 may be 600 fpm. As each particle moves from a conveyor belt to the next, it moves away from the following particles. The effect of transferring the comminuted mixture of weight materials through the group of conveyors therefore, is to disperse the mixture along the first transport line 610. This dispersing or thinning out of the particles greatly improves the separation efficiency produced by the linear motor separator.

One or more linear motor separator units are positioned directly below the highest speed conveyor belt 608, as indicated at 612. The linear motor is similar to the stator of a conventional induction motor, but with the stator in effect rolled out in a flat plane. Such linear motors are well known in the art, as discussed in the article "Linear-Motion Electrical Machines" by E. R. Laithwaite, proceedings of the IEE, Volume 58, No. 4, pages 531–542, April 1970. The linear motors 612 are positioned immediately below the upper belt portion of the endless belt conveyor to provide a moving magnetic force field which extends in a transverse direction to the path of movement of the particles. The belt above the linear motors is essentially non-conductive and non-magnetic. The moving magnetic force field reacts with the conductive particulatle non-ferrous metals to produce a transverse force tending to move the conductive particles to the left, as viewed in FIG. 11. Thus the conductive non-ferrous metal particles are drawn off the side of the conveyor belt 608 while the remaining non-conductive essentially organic fraction of the mixture is conveyed along the same path by the conveyor belt 16 where it is deposited on an output conveyor 614 which passes the rejected material to landfill or pyrolysis.

The conductive non-ferrous metals fraction deflected off the conveyor by the linear motors is directed by chute 613 onto a lift type conveyor 616 which moves the particles in a direction transverse to the path of the conveyor 608. The lift conveyor 616 raises the non-ferrous metal particles up and deposits them on top of a second group of aligned endless belt conveyors 618 and 620 which extends parallel to but travel in the opposite direction from the first group of conveyors 604, 606, and 608. Conveyors 618 and 670 also operate at successively higher linear speeds, the conveyor belt 618 for example having a linear speed of 200 fpm and the conveyor belt 620 moving at a linear speed of 400 fpm. A second pair of linear motors 622 are positioned adjacent the end of the second high-speed conveyor 620 for deflecting the non-ferrous metal particles off the conveyor 620 through chute 621 into a tote box 624 or other suitable collection and storage means.

Any remaining non-conductive materials are diverted from the end of the conveyor 620 onto a lift conveyor 626 which returns the materials onto the input conveyor 602 for recycling.

In typical operation, the processing of the non-ferrous metals fraction results in an effluent of about 80% metals from the first transport line 610 and 96% metals from second transport line 628.

For periods of non use there may be provided an intercepting conveyor line (not shown) perpendicular to belt 602 operated with a divertor mechanism which returns the feed to a storage vessel or comminutor operating during periods of non use.

What is claimed is:

1. A process for recovery of values contained in solid waste materials including organic, ferrous metals, non-ferrous metals and glass constituents which comprises, in combination, the steps of:
   (a) initially comminuting the solid waste material;
   (b) magnetically separating ferrous metal from the initially comminuted waste material to leave a substantially ferrous metal free comminuted solid waste material;
   (c) classifying the substantially ferrous metal free comminuted solid waste material into a substantially organic fraction and a substantially inorganic fraction by an elutriating flow of a gas upward through the substantially ferrous metal free comminuted solid waste material;
   (d) separating, by particle size differential, the substantially inorganic fraction into a first glass-rich inorganic fraction and a non-ferrous metals fraction;
   (e) further comminuting the first glass-rich inorganic fraction and isolating from the comminuted first glass-rich inorganic fraction, particles in the size range from about 20 to about 325 mesh;
   (f) subjecting the particles from glass-rich fraction having a particle size from about 20 to about 325 mesh to froth flotation in the presence of a beneficiating amount of a flotation reagent for glass to form a float comprising predominately glass and an inorganic tailing;
   (g) recovering the glass from the float;
   (h) drying the substantially organic fraction formed in step (c) and forming a dried substantially organic fraction of a particle size less than about 5 mesh;
   (i) subjecting the formed, dried substantially organic fraction to flash pyrolysis by:
      (i) combining the formed, dried substantially organic fraction, a particulate heat source and a carrier gas which is non-deleteriously reactive with respect to pyrolysis products under turbulent flow conditions in a flash pyrolysis zone maintained at a temperature from about 600 to about 2000° F by the flow of the particulate heat source therethrough to form a pyrolysis product stream including carbon containing solid residue of pyrolysis, the particulate source of heat, gases and condensible pyrolytic oils;
      (ii) separating a mixture of the carbon containing solid residue of pyrolysis and the particulate source of heat to form a resultant remaining pyrolysis product stream;
      (iii) subjecting at least a portion of the mixture of the carbon containing solid residue of pyrolysis and particulate source of heat to at least partial oxidation in the presence of a source of oxygen to form the particulate source of heat for feed to the pyrolysis zone.

2. The process of claim 1 in which the first glass-rich fraction is subjected to classification to remove organic constituents by density differential prior to further comminution of the first glass-rich fraction.

3. The process of claim 1 which additionally comprises:
   (a) subjecting the formed dried substantially organic fraction to classification to concentrate the organics of the dried predominately organic fraction in one stream and form a second predominately inorganic fraction;
   (b) further classifying the second predominately inorganic fraction into at least an organic fines fraction, and a second glass-rich fraction by subjecting the second predominately inorganic fraction to the combined actions of vibration and an upward flow of a gas therethrough to carry the organic fines fraction from the second glass-rich fraction;
   (c) degreasing the second glass-rich fraction and combining the degreased second glass-rich fraction with said first glass-rich fraction.

4. The process of claim 2 which additionally comprises:
   (a) subjecting the formed dried substantially organic fraction to classification to concentrate the organics of the dried predominately organic fraction in one stream and form a second predominately inorganic fraction;
   (b) further classifying the second predominately inorganic fraction into at least an organic fines fraction, and a second glass-rich fraction by subjecting the second predominately inorganic fraction to the combined actions of vibration and an upward flow of a gas therethrough to carry the organic fines fraction from the second glass-rich fraction;
   (c) degreasing the second glass-rich fraction and combining the degreased second glass-rich fraction with said first glass-rich fraction.

5. The process of claim 1 in which the particulate source of heat for pyrolysis is particulate inorganic solid heat source formed from decarbonization of the carbon containing solid residue of pyrolysis and the pyrolysis zone is maintained at a temperature of from 600° to about 1700° F.

6. The process of claim 3 in which the particulate source of heat for pyrolysis is particulate inorganic solid heat source formed from decarbonization of the carbon containing solid residue of pyrolysis and the pyrolysis zone is maintained at a temperature from about 600° to about 1700° F.

7. The process of claim 4 in which the particulate source of heat for pyrolysis is particulate inorganic solid heat source formed from decarbonization of the carbon containing solid residue of pyrolysis and the pyrolysis zone is maintained at a temperature from about 600° to about 1700° F.

8. The process of claim 1 in which:
   (a) the predominately non-ferrous metals fraction is passed to a first transport line and caused to undergo stage wise increases in velocity to disperse the particulate non-ferrous metals fraction on said first transport line;
   (b) subjecting the dispersed predominately non-ferrous metals fraction to a moving magnetic force field to withdraw and concentrate the conductive non-ferrous metals and reject a substantially non-conductive residue;

(c) distributing the separated conductive non-ferrous metals onto a second transport line and dispersing the distributed conductive non-ferrous metals on said second transport line by stage wise increases in line velocity and subjecting the dispersed conductive non-ferrous metals to a second moving magnetic force field to selectively remove and further concentrate the conductive non-ferrous metals.

9. The process of claim 4 in which:
(a) the predominately non-ferrous metals fraction is passed to a first transport line and caused to undergo stage wise increases in velocity to disperse the particulate non-ferrous metals fraction on said first transport line;
(b) subjecting the dispersed predominately non-ferrous metals fraction to a moving magnetic force field to withdraw and concentrate the conductive non-ferrous metals and reject a substantially non-conductive residue;
(c) distributing the separated conductive non-ferrous metals onto a second transport line and dispersing the distributed conductive non-ferrous metals on said second transport line by stage wise increases in line velocity and subjecting the dispersed conductive non-ferrous metals to a second moving magnetic force field to selectively remove and further concentrate the conductive non-ferrous metals.

10. The process of claim 7 in which:
(a) the predominately non-ferrous metals fraction is passed to a first transport line and caused to undergo stage wise increases in velocity to disperse the particulate non-ferrous metals fraction on said first transport line;
(b) subjecting the dispersed predominately non-ferrous metals fraction to a moving magnetic force field to withdraw and concentrate the conductive non-ferrous metals and reject a substantially non-conductive residue;
(c) distributing the separated conductive non-ferrous metals onto a second transport line and dispersing the distributed conductive non-ferrous metals on said second transport line by stage wise increases in line velocity and subjecting the dispersed conductive non-ferrous metals to to a second moving magnetic force field to selectively remove and further concentrate the conductive non-ferrous metals.

11. The process of claim 1 in which the pyrolysis zone is maintained at a temperature from about 600° to about 1400° F.

12. A process for recovery of values contained in solid waste materials including organics, ferrous metals, non-ferrous metals and glass constituents which comprise, in combination, the steps of:
(a) initially comminuting the solid waste material;
(b) magentically separating ferrous metal from the initially comminuted waste material to leave a substantially ferrous metal free comminuted solid waste material;
(c) classifying the substantially ferrous metal free comminuted solid waste material into a substantially organic fraction and a substantially inorganic fraction by an elutriating flow of a gas upward through the substantially ferrous metal free comminuted solid waste material;
(d) separating by particle size differential, the substantially inorganic fraction into a first glass-rich inorganic fraction and a non-ferrous metals fraction;
(e) drying the substantially organic fraction and subjecting the dried substantially organic fraction to classification to concentrate the organics of the dried predominately organic fraction in one stream and form a second predominately inorganic fraction;
(f) further classifying the second predominately inorganic fraction to form an organic fines fraction and a second glass-rich fraction by subjecting the second predominately inorganic fraction to the combined actions of vibration and an upward flow of a gas therethrough to carry the organic fines fraction from the second glass-rich fraction;
(g) degreasing the second glass-rich fraction and combining the degreased second glass-rich fraction with said first glass-rich fraction;
(h) comminuting the combined first and second glass rich fractions and holding from the comminuted combined first and second glass-rich fractions particles in the size range from about 20 to about 325 mesh;
(i) subjecting the particles from the comminuted, combined glass-rich fractions having a particle size from about 20 to about 325 mesh to froth flotation in the presence of a beneficiating amount of flotation reagent for glass to form a float comprising predominately glass and an inorganic tailing;
(j) recovering the glass from the float;
(k) forming the dried concentrated organic fraction into particles of a size less than about 5 mesh, said concentrated organic fraction including a minor amount of inorganics;
(l) subjecting the dried concentrated organic fraction to flash pyrolysis by the steps of:
  (i) combining the comminuted, dried, concentrated organic fraction, a hot particulate inorganic solid heat source formed from decarbonization of the carbon containing solid residue of pyrolysis and a carrier gas which is non-deleteriously reactive with respect to pyrolysis products under turbulent flow conditions in a flash pyrolysis zone maintained at a temperature from about 600° to about 1400° F by the flow of the heat source therethrough to form a pyrolysis product stream including carbon containing solid residue of pyrolysis, the heat source, gases and condensible pyrolytic oils;
  (ii) separating a mixture of carbon containing solid residue of pyrolysis and particulate heat source to form a resultant remaining pyrolysis product stream;
  (iii) subjecting at least a portion of the mixture of carbon containing solid residue of pyrolysis and particulate heat source to at least partial oxidation in the presence of a source of oxygen to decarbonize the carbon containing solid residue and form the particulate inorganic solid heat source for feed to the pyrolysis zone.

13. The process of claim 12 in which the first glass-rich fraction is subjected to classification to remove organic constituents by density differential prior to further comminution of the combined glass-rich fractions.

14. The process of claim 12 in which:
(a) the predominately non-ferrous metals fraction is passed to a first transport line and caused to undergo stage wise increases in velocity to disperse the particulate non-ferrous metals fraction on said first transport line;

(b) subjecting the dispersed predominately non-ferrous metals fraction to a moving magnetic force field to withdraw and concentrate the conductive non-ferrous metals and reject a substantially non-conductive residue;

(c) distributing the separated conductive non-ferrous metals onto a second transport line and dispersing the distributed conductive non-ferrous metals on said second transport line by stage wise increases in line velocity and subjecting the dispersed conductive non-ferrous metals to a second moving force field to selectively remove and further concentrate the conductive non-ferrous metals.

15. The process of claim 13 in which:

(a) the predominately non-ferrous metals fraction is passed to a first transport line and caused to undergo stage wise increases in velocity to disperse the particulate non-ferrous metals fraction on said first transport line;

(b) subjecting the dispersed predominately non-ferrous metals fraction to a moving magnetic force field to withdraw and concentrate the conductive non-ferrous metals and reject a substantially non-conductive residue;

(c) distributing the separated conductive non-ferrous metals onto a second transport line and dispersing the distributed conductive non-ferrous metals on said second transport line by stage wise increases in line velocity and subjecting the dispersed conductive non-ferrous metals to a second moving magnetic force field to selectively remove and further concentrate the conductive non-ferrous metals.

16. The process of claim 12 in which flash pyrolysis is conducted at a temperature range from about 800° to about 1350° F.

17. Apparatus for the recovery of values contained in solid waste materials including organic, ferrous metals, non-ferrous metals and glass constituents which comprises in combination:

(a) primary comminuting means to reduce the size of solid waste material to a particle size consonant for separation into a predominately organic fraction and a predominately inorganic fraction;

(b) means to magnetically separate ferrous metals from the effluent of the primary comminuting means;

(c) first air classification means for separating the effluent of magnetic separating means by gas flow elutriation into a predominately organic fraction and a predominately inorganic fraction;

(d) screen classification means for separation of the predominately inorganic fraction into a first glass-rich fraction and a non-ferrous metals fraction;

(e) first classification means to separate the first glass-rich fraction into a glass-rich inorganic concentrate and an organic residue;

(f) means to comminute the glass-rich inorganic concentrate to a particle size less than about 20 mesh;

(g) second classification means to isolate from the comminuted glass-rich inorganic concentrate particles in a particle size range conducive to froth flotation;

(h) means to float glass from the isolated particles from the glass-rich inorganic concentrate;

(i) means to substantially dry the predominately organic fraction;

(j) means to form the dried predominately organic fraction to particles of a size less than about 5 mesh; and (k) means for turbulent flow flash pyrolysis of dried fine particle size organic fraction to form carbon containing solid residue of pyrolysis, pyrolytic oils and gases.

18. Apparatus as claimed in claim 17 which includes:

(a) means, following the means to substantially dry the predominately organic fraction, to further classify the dried, substantially organic fraction to a concentrated organic fraction and a second predominately inorganic fraction;

(b) means to classify the second predominately inorganic fraction into an organic fines fraction, and a second glass-rich inorganic fraction, said means including classification by vibration and gas lift;

(c) means to receive and degrease the formed second glass-rich inorganic fraction; and (d) means to combine the formed second glass-rich inorganic fraction with the first glass-rich inorganic fraction.

19. Apparatus as claimed in claim 17 which includes:

(a) means to transport the non-ferrous metals fraction to a first group of conveyor belts serially aligned for conveying the mixture along a first path, each successive conveyor belt along the path operating at a higher linear speed than the previous conveyor belt; whereby the mixture is accelerated and dispersed;

(b) at least one linear motor adjacent the highest speed conveyor belt producing a moving magnetic force field extending perpendicular to said path for deflecting conductive non-ferrous metals in the mixture off one side of the conveyor belt;

(c) a second group of conveyor belts, each successive belt having a higher linear speed than the previous conveyor of the group;

(d) means for transferring the conductive non-ferrous metals deflected off the side of the first conveyor belt group by the linear motor to the lowest speed conveyor belt of the second group, and (e) at least one additional linear motor adjacent the highest speed conveyor belt of the second group for deflecting a concentrated conductive non-ferrous metals fraction on the second conveyor group off one side of the highest speed conveyor belt.

20. Apparatus as claimed in claim 18 which includes:

(a) means to transport the non-ferrous metals fraction to a first group of conveyor belts serially aligned for conveying the mixture along a first path, each successive conveyor belt along the path operating at a higher linear speed than the previous conveyor belt, whereby the mixture is accelerated and dispersed;

(b) at least one linear motor adjacent the highest speed conveyor belt producing a moving magnetic force field extending perpendicular to said path for deflecting conductive non-ferrous metals in the mixture off one side of the conveyor belt;

(c) a second group of conveyor belts, each successive belt having a higher linear speed than the previous conveyor of the group;

(d) means for transferring the conductive non-ferrous metals deflected off the side of the first conveyor belt group by the linear motor to the lowest speed conveyor belt of the second group; and (e) at least one additional linear motor adjacent the highest speed conveyor belt of the second group for deflecting a concentrated conductive non-ferrous metals fraction on the second conveyor group off one side of the highest speed conveyor belt.

21. A process as claimed in claim 1 in which the residence time in the flash pyrolysis zone is less than 10 seconds.

* * * * *

UNITED STATES PATENT AND TRADEMARK OFFICE
CERTIFICATE OF CORRECTION

PATENT NO. : 4,077,847
DATED : March 7, 1978
INVENTOR(S) : Charles K. Choi et al It is certified that error appears in the above-identified patent and that said Letters Patent are hereby corrected as shown below:

Col. 1, line 68, change "prolysis" to -- pyrolysis --.
Col. 2, line 15, change "th" to -- the --;

line 46, change "separtor" to -- separator --;
       line 69, change "fieled" to -- field --.
Col. 11, line 29, change "deteriously" to -- deleteriously --.
Col. 16, line 23, change "hoppr" to -- hopper --;
       line 24, change "pevent" to -- prevent --.

Col. 21, line 42, change "thicken" to -- thickener --;
       line 54, change "of" to -- or --.
Col. 27, line 52, change "separating" to -- separation --.

Signed and Sealed this

Twenty-sixth Day of September 1978

[SEAL]

Attest:

RUTH C. MASON
*Attesting Officer*

DONALD W. BANNER
*Commissioner of Patents and Trademarks*